(12) United States Patent
Yoshizawa et al.

(10) Patent No.: US 8,597,805 B2
(45) Date of Patent: *Dec. 3, 2013

(54) BINDER COMPOSITION FOR MAGNETIC RECORDING MEDIUM AND MAGNETIC RECORDING MEDIUM

(75) Inventors: Masataka Yoshizawa, Minami-ashigara (JP); Ayako Matsumoto, Minami-ashigara (JP); Satoshi Matsubaguchi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 326 days.

This patent is subject to a terminal disclaimer.

(21) Appl. No.: 13/077,337

(22) Filed: Mar. 31, 2011

(65) Prior Publication Data

US 2011/0244270 A1 Oct. 6, 2011

(30) Foreign Application Priority Data

Mar. 31, 2010 (JP) .................................. 2010-083628

(51) Int. Cl.
*G11B 5/706* (2006.01)
(52) U.S. Cl.
USPC ...................................... 428/844.9
(58) Field of Classification Search
None
See application file for complete search history.

(56) References Cited

U.S. PATENT DOCUMENTS

| 5,512,651 | A | * | 4/1996 | Carlson et al. | 528/73 |
| 6,265,060 | B1 | * | 7/2001 | Arudi et al. | 428/323 |
| 2006/0019126 | A1 | * | 1/2006 | Huelsman et al. | 428/836 |
| 2006/0063041 | A1 | * | 3/2006 | Tsujimoto et al. | 428/844.6 |

FOREIGN PATENT DOCUMENTS

| JP | 61-194627 A | 8/1986 |
| JP | 06-111277 A | 4/1994 |
| JP | 08-067855 A | 3/1996 |
| JP | 2002-025035 A | 1/2002 |
| JP | 2003-242625 A | 8/2003 |
| JP | 2004-295926 A | 10/2004 |

OTHER PUBLICATIONS

Office Action dated Feb. 26, 2013 in Japanese Application No. 2010-083628.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

A binder composition for a magnetic recording medium contains a vinyl copolymer having structural units denoted by each of formulas [1], [2] and [3]. In formula [1], $R^1$ is hydrogen, halogen, or methyl, $L^1$ is a single bond or a divalent linking group, and Y is an alicyclic group. In formula [2], $R^2$ is hydrogen, halogen, or methyl, $L^2$ is a single bond or a divalent linking group, and Z is a hydrocarbon group with a carbon number of from 8 to 50. In formula [3], $R^3$ is hydrogen, halogen, or methyl, and $L^3$ is a single bond or a divalent linking group:

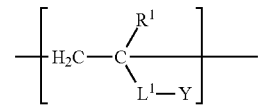

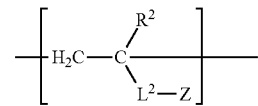

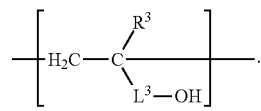

18 Claims, No Drawings

BINDER COMPOSITION FOR MAGNETIC RECORDING MEDIUM AND MAGNETIC RECORDING MEDIUM

CROSS-REFERENCE TO RELATED APPLICATIONS

This application claims the benefit of priority under 35 USC 119 to Japanese Patent Application No. 2010-083628, filed on Mar. 31, 2010, which is expressly incorporated herein by reference in its entirety.

BACKGROUND OF THE INVENTION

1. Field of the Invention

The present invention relates to a binder composition for a magnetic recording medium. More particularly, the present invention relates to a binder composition for a magnetic recording medium containing a binder resin that is suited to the manufacturing of magnetic recording media having good electromagnetic characteristics.

The present invention further relates to a magnetic recording medium containing the above binder resin.

2. Discussion of the Background

In particulate magnetic recording media, the binder plays important roles with respect to electromagnetic characteristics.

Vinyl chloride resin, polyurethane resin, polyester resin, acrylic resin, and various other resins are employed as binders in magnetic recording media. Of these, vinyl polymers such as vinyl chloride resin and acrylic resin are widely employed due to the high degree of unit freedom, ease of conducting the synthesis reaction, and the like they afford (see Document 1: Japanese Unexamined Patent Publication (KOKAI) Heisei No. 8-67855; Document 2: Japanese Unexamined Patent Publication (KOKAI) No. 2004-295926; and Document 3: Japanese Unexamined Patent Publication (KOKAI) Heisei No. 6-111277, which are expressly incorporated herein by reference in their entirety).

In addition to using microparticulate magnetic material, increasing the smoothness of the magnetic layer surface by dispersing microparticulate magnetic material to a high degree is an effective way of achieving high-density recording in the field of magnetic recording. Further, increasing the dispersion of the nonmagnetic powder contained in the nonmagnetic layer positioned beneath the magnetic layer is an effective way to increase the smoothness of the magnetic layer surface. Accordingly, the introduction of adsorptive functional groups (polar groups) such as $SO_3Na$ groups into the binders of magnetic recording media is widely practiced. However, when the quantity of polar groups introduced into the binder is increased to increase dispersion of the microparticulate powder, there is a risk of association between polar groups conversely causing a decrease in dispersion. Accordingly, it becomes difficult to ensure adequate dispersion by simply introducing polar groups. That is, it is difficult to achieve higher density recording by simply introducing polar groups into conventional vinyl polymers, including the polymers described in Documents 1 to 3.

SUMMARY OF THE INVENTION

An aspect of the present invention provides for a binder for use in magnetic recording media that is comprised of a vinyl polymer and permits the manufacturing of magnetic recording media for use in high-density recording that have good electromagnetic characteristics.

The present inventors conducted extensive research into achieving the above binder, resulting in the discovery that a vinyl polymer having the structural unit denoted by general formula [G] below and the structural unit denoted by general formula [P] below permitted a high degree of dispersion of ultrafine particulate powder. This was attributed to the repeating unit (the repeating unit denoted by general formula [a]) having a graft chain structure contained in general formula [G] and the polar group contained in general formula [P] contributing to dispersion. This point will be described in greater detail. The present inventors surmised that effective spreading of the graft chain structure contained in general formula [a] within the dispersion medium inhibited the aggregation of particles, and that the polar groups contained in general formula [P] adsorbed to the surface of the particles, increasing dispersion of the microparticulate powder within the coating liquid.

The present invention was devised based on these discoveries.

An aspect of the present invention relates to a binder composition for a magnetic recording medium, which comprises a vinyl copolymer comprising a structural unit denoted by general formula [G] and a structural unit denoted by general formula [P]:

General formula [G]

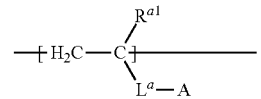

wherein, in general formula [G], $R^{a1}$ denotes a hydrogen atom, a halogen atom, or a methyl group, $L^a$ denotes a single bond or a divalent linking group, and A denotes a repeating unit denoted by general formula [a]:

General formula [a]

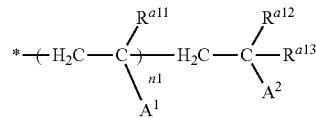

wherein, in general formula [a], each of $R^{a11}$, $R^{a12}$, and $R^{a13}$ independently denotes a hydrogen atom, a halogen atom, or a methyl group, each of $A^1$ and $A^2$ independently denotes a vinyl monomer residue, n1 denotes an integer of equal to or greater than 1, and * denotes a position of a bond with the group denoted by $L^a$;

General formula [P]

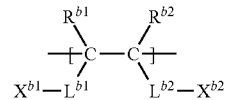

wherein, in general formula [P], each of $R^{b1}$ and $R^{b2}$ independently denotes a hydrogen atom, a halogen atom, or a methyl group, each of $L^{b1}$ and $L^{b2}$ independently denotes a single bond or a divalent linear linking group, each of $X^{b1}$ and $X^{b2}$ denotes a hydrogen atom, a halogen atom, a methyl group, or a polar group selected from the group consisting of a sulfonic acid group, a sulfonate group, a carboxylic acid group, a carboxylate group, a phosphoric acid group, and a phosphate group, wherein at least either $X^{b1}$ or $X^{b2}$ is the polar group.

The repeating unit denoted by general formula [a] may be a repeating unit denoted by general formula [a1]:

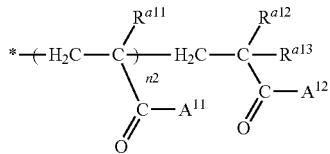

General formula [a1]

wherein, in general formula [a1], each of $R^{a11}$, $R^{a12}$, $R^{a13}$, and * is defined as in general formula [a], each of $A^{11}$ and $A^{12}$ independently denotes a (meth)acrylate monomer residue, and n2 denotes an integer of equal to or greater than 10 but equal to or less than 500.

The vinyl copolymer may further comprise a structural unit denoted by general formula [1], a structural unit denoted by general formula [2], and a structural unit denoted by general formula [3]:

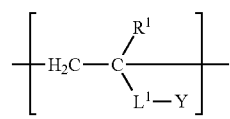

General formula [1]

wherein, in general formula [1], $R^1$ denotes a hydrogen atom, a halogen atom, or a methyl group, $L^1$ denotes a single bond or a divalent linking group, and Y an alicyclic group;

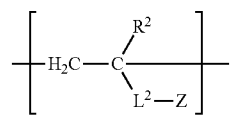

General formula [2]

wherein, in general formula [2], $R^2$ denotes a hydrogen atom, a halogen atom, or a methyl group, $L^2$ denotes a single bond or a divalent linking group, and Z denotes a hydrocarbon group with a carbon number ranging from 8 to 50;

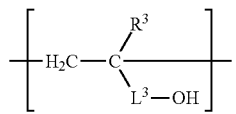

General formula [3]

wherein, in general formula [3], $R^3$ denotes a hydrogen atom, a halogen atom, or a methyl group, and $L^3$ denotes a single bond or a divalent linking group.

The structural unit denoted by general formula [3] may be a structural unit denoted by general formula [6]:

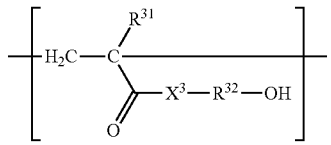

General formula [6]

wherein, in general formula [6], $R^{31}$ denotes a hydrogen atom or a methyl group, $X^3$ denotes —O—, —S—, or a divalent linking group denoted by —N($R^{33}$)—, $R^{33}$ denotes a hydrogen atom or an optionally substituted alkyl group with a carbon number ranging from 1 to 8, and $R^{32}$ denotes an optionally substituted alkylene group with a carbon number ranging from 2 to 8 or a divalent group in which multiple such alkylene groups are linked through a linking group.

The structural unit denoted by general formula [1] may be a structural unit denoted by general formula [4]:

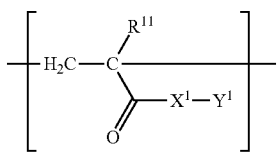

General formula [4]

wherein, in general formula [4], $R^{11}$ denotes a hydrogen atom or a methyl group, $X^1$ denotes —O—, —S—, or a divalent linking group denoted by —N($R^{12}$)—, $R^{12}$ denotes a hydrogen atom or an optionally substituted alkyl group with a carbon number ranging from 1 to 8, and $Y^1$ denotes an alicyclic condensed cyclic group.

The structural unit denoted by general formula [2] may be a structural unit denoted by general formula [5]:

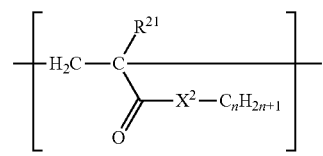

General formula [5]

wherein, in general formula [5], $R^{21}$ denotes a hydrogen atom or a methyl group, $X^2$ denotes a divalent linking group denoted by —(O)$m^1$-, —(S)$m^2$-, or —{N($R^{22}$)}$m^3$-, each of $m^1$, $m^2$, and $m^3$ independently denotes an integer of equal to or greater than 1, $R^{22}$ denotes an optionally substituted alkyl group with a carbon number ranging from 1 to 8, and n denotes an integer ranging from 12 to 30.

The binder composition may further comprise a polyisocyanate.

A further aspect of the present invention relates to a magnetic recording medium comprising a magnetic layer comprising a ferromagnetic powder and a binder on a nonmagnetic support, which comprises at least one layer comprising a binder of which constituent component is the above vinyl copolymer.

The above layer may comprise a reaction product of the vinyl copolymer and a polyisocyanate.

The above layer may be the magnetic layer.

The above layer may be a nonmagnetic layer comprising a nonmagnetic powder and a binder and being positioned between the magnetic layer and the nonmagnetic support.

The ferromagnetic powder may be a hexagonal ferrite powder having an average plate diameter ranging from 10 nm to 50 nm.

The ferromagnetic powder may be a ferromagnetic metal powder having an average major axis length ranging from 20 nm to 50 nm.

The present invention can provide a magnetic recording medium that affords good electromagnetic characteristics in high-density recording.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Binder Composition

The binder composition for a magnetic recording medium of the present invention comprises a vinyl copolymer comprising a structural unit denoted by general formula [G] and a structural unit denoted by general formula [P]. The above vinyl copolymer is also referred to as "the binder of the present invention", hereinafter. As stated above, the binder of the present invention, in the form of a vinyl copolymer containing the above two structural units, can disperse microparticulate powder to a high degree and thus enhance the surface smoothness of the magnetic layer.

The binder of the present invention will be described in greater detail below. The structural unit denoted by general formula [G] will also be referred to as structural unit [G] below. The same applies to the structural units denoted by the other general formulas. The structural unit [G] contained in the binder of the present invention may be of a single type, or may comprised of two or more different types. The same applies to the other structural units.

Structural Unit [G]

General formula [G]

As set forth above, the binder of the present invention has a graft chain structure in general formula [G]. In this regard, as relates to graft copolymers suited to magnetic recording media, Japanese Unexamined Patent Publication (KOKAI) Heisei No. 7-9696, which is expressly incorporated herein by reference in its entirety, discloses a graft copolymer having a perfluoroalkyl group. However, the graft copolymer described in this publication is employed as a lubricant; which doesn't have properties required for a binder.

General formula [G] will be described in detail below.

In general formula [G], $R^{a1}$ denotes a hydrogen atom, a halogen atom, or a methyl group, desirably denoting a hydrogen atom or a methyl group. Examples of halogen atoms are chlorine, bromine, and iodine atoms.

$L^a$ denotes a single bond or a divalent linking group, with a linking group comprising any from among oxygen atoms, nitrogen atoms, and sulfur atoms being desirable. In terms of synthesis, a divalent linking group that is bonded through —C(O)— to a carbon atom on the main chain, or a divalent linking group that is bonded to a group denoted by A below through a sulfur atom, is desirable. A linking group with three to eight connected divalent groups selected from the group consisting of —O—, —S—, —N—, —C(=O)—, —NHC(=O)— alkylene groups with 2 to 4 carbon atoms, and arylene groups with 6 to 10 carbon atoms is preferred from the perspective of enhancing dispersion.

In general formula [G], A denotes a repeating unit denoted by general formula [a]. As stated above, the presence of the graft chain structure denoted by general formula [a] in the binder of the present invention is thought to play a role in enhancing dispersion.

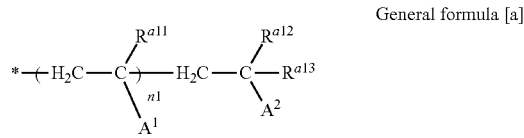

General formula [a]

In general formula [a], each of $R^{a11}$, $R^{a12}$, and $R^{a13}$ independently denotes a hydrogen atom, a halogen atom, or a methyl group. The details are identical to those set forth for $R^{a1}$. In general formula [a], the "*" denotes the position of the bond with the group denoted by $L^a$.

In general formula [a], each of $A^1$ and $A^2$ independently denotes a vinyl monomer residue. Examples of vinyl monomer residues are the various substituents contained in vinyl monomers given by way of example for copolymerizable monomers. Of these, a —OCOR group, —C(=O)OR group (R being an alkyl group), —C(=O)OR'OH (R' being an alkylene group), aryl group (desirably an aryl group with 6 to 10 carbon atoms), and cyano group are desirable. An alkyl group with 1 to 8 carbon atoms is desirable and a methyl group is preferable as the alkyl groups denoted by R and R'.

In general formula [a], n1 denotes an integer of equal to or greater than 1. From the perspective of enhancing dispersion, an integer of equal to or greater than 10 is desirable, and from the perspective of solubility, an integer of equal to or less than 500 is desirable.

Since n1 denotes an integer of equal to or greater than 1 in general formula [a], two or more structural units with branched structures are present in the binder of the present invention. However, these structural units do not have to be identical; different structures may be incorporated.

From the perspective of enhancing dispersion, the repeating unit denoted by general formula [a] is desirably denoted by general formula [a1] below.

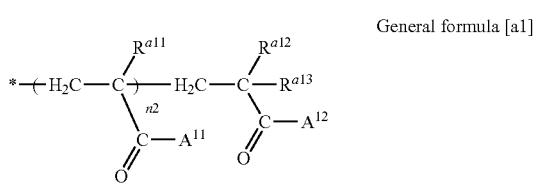

General formula [a1]

In general formula [a1], each of $R^{a11}$, $R^{a12}$, $R^{a13}$, and * is defined as in general formula [G] and the details are as set forth above.

In general formula [a1], each of $A^{11}$ and $A^{12}$ independently denotes a (meth)acrylate monomer residue. Examples of (meth)acrylate monomer residues are the various substituents contained in the (meth)acrylate monomers given by way of example for copolymerizable monomers. Alkyl groups are desirable, alkyl groups having 1 to 8 carbon atoms are preferred, and methyl groups are of greater preference as these substituents.

In general formula [a1], n2 denotes an integer of equal to or greater than 10 but equal to or less than 500. From the perspective of achieving both dispersion and solubility, an integer of equal to or greater than 20 but equal to or less than 100 is desirable.

Structural unit [G] set forth above can be derived from the vinyl monomer denoted by general formula [G'] below.

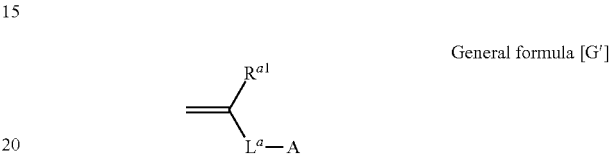

General formula [G']

(In general formula [G'], each of $R^{a1}$, $L^a$, and A is defined as in general formula [G].)

Specific examples of the vinyl monomer (graft chain monomer) denoted by general formula [G'] will be given below. However, the present invention is not limited to the specific examples given below.

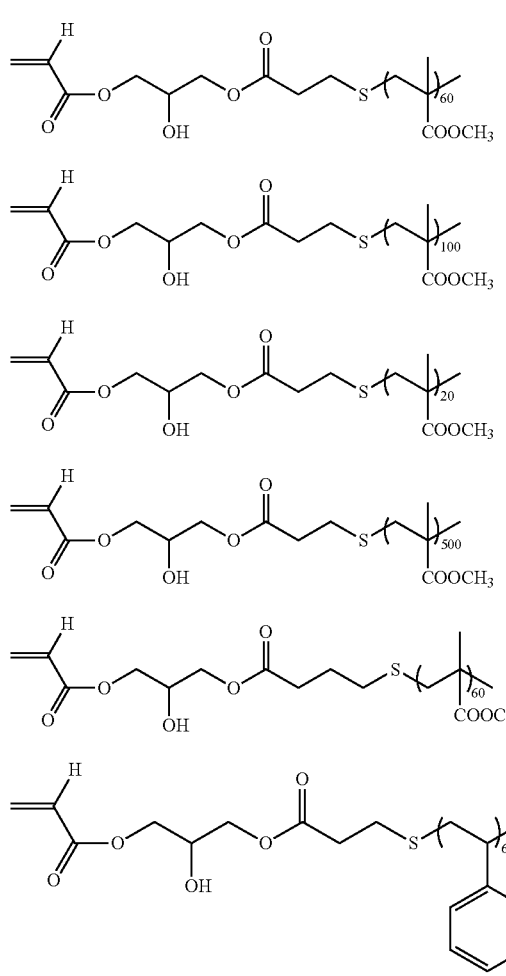

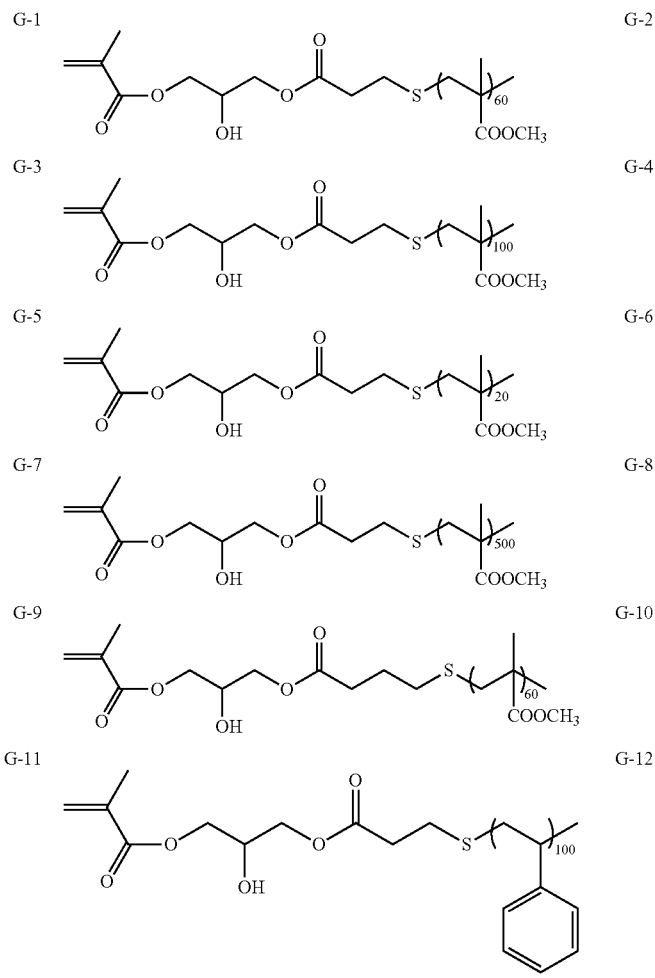

-continued

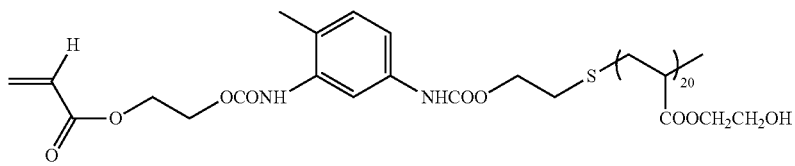

G-29

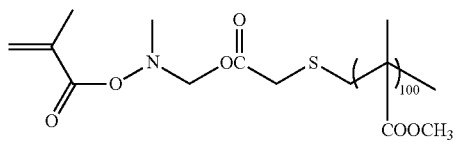

G-30

Structural Unit [P]

In the binder of the present invention, a functional group (polar group) that is capable of adsorbing to the surface of the magnetic powder and nonmagnetic powder in a particulate magnetic recording medium is present in structural unit [P]. The presence of both structural unit [P] and structural unit [G] can increase the dispersion of the powder in the coating liquid.

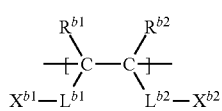

General formula [P]

In general formula [P], each of $R^{b1}$ and $R^{b2}$ independently denotes a hydrogen atom, a halogen atom, or a methyl group. The details are as described above for $R^{a1}$ and the like in general formula [G].

Each of $L^{b1}$ and $L^{b2}$ independently denotes a single bond or a divalent linear linking group. That is, the linking group does not contain a graft chain structure such as that contained in structural unit [G]. This is because a structure containing a graft chain in the linking group causes adsorption between particles of magnetic powder and nonmagnetic powder, compromising dispersion. From the perspective of enhancing dispersion, $L^{b1}$ and $L^{b2}$ are desirably single bonds or divalent linear linking groups bonded through —C(O)— groups to carbon atoms on the main chain.

Each of $X^{b1}$ and $X^{b2}$ denotes a hydrogen atom, a halogen atom (chlorine atom, bromine atom, iodine atom, or the like), a methyl group, or a polar group selected from the group consisting of a sulfonic acid (salt) group, a carboxylic acid (salt) group, and a phosphoric acid (salt) group. In the present invention, the term "sulfonic acid (salt) group" includes the sulfonic acid group (—$SO_3H$), sulfonate groups such as the $SO_3Na$ group, $SO_3K$ group, and $SO_3Li$ group, and salts thereof. The same applies to carboxylic acid (salt) groups and phosphoric acid (salt) groups. In structural unit [P], at least either $X^{b1}$ or $X^{b2}$ contains the polar group. This group adsorbs to the powder, enhancing dispersion of the powder. From the perspective of inhibiting association of polar groups, either $X^{b1}$ or $X^{b2}$ desirably contains the polar group.

To further enhance dispersion, the quantity of the polar group that is incorporated into the binder of the present invention is desirably 10 to 1,000 μeq/g.

Structural unit [P] as set forth above can be derived from the vinyl monomer denoted by general formula [P'] below.

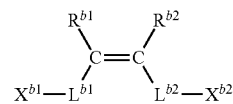

General formula [P']

(In general formula [P'], each of $R^{b1}$, $R^{b2}$, $L^{b1}$, $L^{b2}$, $X^{b1}$, and $X^{b2}$ is defined as in general formula [P].)

Specific examples of monomers denoted by general formula [P'] containing sulfonic acid (salt) groups are given below. However, the present invention is not limited to the following specific examples.

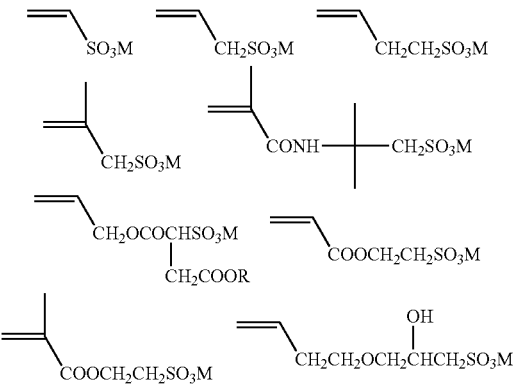

(In the above, M denotes a hydrogen atom, an alkali metal atom, or an ammonium salt, and R denotes an alkyl group.)

Examples of monomers denoted by general formula [P'] containing carboxylic acid (salt) groups are unsaturated carboxylic acids such as (meth)acrylic acid, maleic acid, and itaconic acid; unsaturated carboxylic anhydrides such as maleic anhydride and itaconic anhydride; and half-esters thereof.

Examples of monomers denoted by general formula [P'] containing phosphoric acid (salt) groups are: monomers comprising monophosphoric acid (salt) groups, such as mono[(meth)acryloyloxyethyl] acid phosphate, mono[(meth)acryloyloxypropyl] acid phosphate, mono[(meth)acryloyloxybutyl] acid phosphate, mono[(meth)acryloyloxyethoxynoethyl] acid phosphate, mono[(meth)acryloyloxypolyoxyethyleneglycol] acid phosphate, (meth)acryloyloxyethylmethyl acid phosphate, (meth)acryloyloxyethylbutyl acid phosphate, (meth)acryloyloxypropylethyl acid phosphate, (meth)

acryloyloxyethylmethyl acid phosphate, (meth)acryloyloxy-polyoxyethyleneglycol butyl acid phosphate, vinyl acid phosphate, and alkali metal salts thereof. The above (meth)acrylic acid includes methacrylic acid and acrylic acid. The term "(meth)acryloyl" refers to methacryloyl and acryloyl. The "(meth)acrylate" in the present invention referred to below includes methacrylate and acrylate.

From the perspective of achieving good dispersion, the binder of the present invention in the form of a vinyl copolymer desirably contains equal to or greater than 0.1 molar percent but equal to or less than 75 molar percent, preferably contains equal to or greater than 1 molar percent but equal to or less than 50 molar percent, and more preferably, contains equal to or greater than 1 molar percent but equal to or less than 30 molar percent of structural unit [G] based on all polymerization units constituting the copolymer.

Similarly, from the perspective of achieving good dispersion, the binder of the present invention desirably contains equal to or greater than 0.01 molar percent but equal to or less than 25 molar percent, preferably contains equal to or greater than 0.1 molar percent but equal to or less than 10 molar percent, and more preferably, contains equal to or greater than 0.1 molar percent but equal to or less than 5 molar percent of structural unit [P]. Accordingly, the blending ratio of the various monomers during the polymerization reaction is desirably established to obtain a copolymer having the above desirable composition. The quantity of the above-described polar group incorporated into the binder of the present invention is desirably 10 to 1,000 μeq/g.

Structural Units that can Also be Present

The binder of the present invention can be comprised of just structural units [G] and [P]. However, other structural units can be incorporated as needed to achieve a magnetic recording medium binder with more desirable physical properties. Examples of such structural units that can also be present are the structural unit denoted by general formula [1] below, the structural unit denoted by general formula [2] below, and the structural unit denoted by general formula [3] below. The joint presence of these structural units can further enhance dispersion and improve running durability by further increasing the coating strength. This is primarily attributed to the alicyclic group contained in general formula [1], the long chain or polycyclic hydrocarbon group contained in general formula [2], and the hydroxyl group contained in general formula [3] contributing to dispersion, and the hydroxyl group contained in general formula [3] crosslinking with polyisocyanate to enhance coating strength.

These structural units that can also be present will be described in greater detail below.

Structural Unit [1]

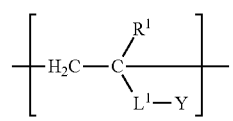

General formula [1]

In general formula [1], $R^1$ denotes a hydrogen atom, a halogen atom, or a methyl group. Examples of halogen atoms are chlorine atoms, bromine atoms, and iodine atoms.

$R^1$ desirably denotes a hydrogen atom or a methyl group, and preferably denotes a methyl group.

In general formula [1], $L^1$ denotes a single bond or a divalent linking group. The divalent linking group denoted by $L^1$ desirably contains a hetero atom, it being desirable for the hetero atom to bond with the alicyclic group denoted by Y. Examples of the hetero group are an oxygen atom, nitrogen atom, and sulfur atom. $L^1$ desirably denotes a single bond or a divalent linking group that bonds through a —C(O)— group to a carbon atom of the main chain, and preferably denotes a divalent linking group denoted by —C(O)$X^1$— in general formula [4] described further below.

In general formula [1], Y denotes an alicyclic group. The alicyclic group may be saturated or unsaturated, and may be monocyclic, polycyclic, or a condensed ring. It may also comprise a substituent.

In the present invention, when a given group contains a substituent, examples of the substituent are an alkyl group (such as an alkyl group having 1 to 6 carbon atoms), a hydroxyl group, an alkoxyl group (such as an alkoxyl group having 1 to 6 carbon atoms), a halogen atom (such as a fluorine atom, chlorine atom, or bromine atom), cyano group, amino group, nitro group, acyl group, and carboxyl group. For the group comprising a substituent, the "carbon number" or the "number of carbon atoms" means the number of carbon atoms of the moiety without the substituent. In the present invention, the word "to" between numbers indicates a range that includes the preceding and succeeding numbers as the minimum value and maximum value thereof, respectively.

The monocyclic alicyclic group denoted by Y is desirably five or six-membered. Specific examples are a cyclohexyl group and a cyclopentyl group. In the case of a polycyclic alicyclic group, it is desirably seven to ten-membered. Specific examples are a bicycloalkyl group, adamantyl group, norbornyl group, and isobornyl group. From the perspective of enhancing dispersibility, Y desirably denotes an alicyclic condensed cyclic group. The alicyclic condensed ring is desirably the alicyclic condensed ring denoted by $Y^1$ in general formula [4], described further below.

From the perspective of enhancing dispersibility, structural unit [1] desirably denotes the structural unit (structural unit [4]) denoted by general formula [4] below.

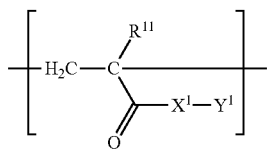

General formula [4]

In general formula [4], $R^{11}$ denotes a hydrogen atom or a methyl group, preferably a methyl group.

$X^1$ denotes —O—, —S—, or a divalent linking group denoted by —N($R^{12}$)—, with —O— being preferred.

$R^{12}$ denotes a hydrogen atom or an optionally substituted alkyl group with a carbon number ranging from 1 to 8. The carbon number of the alkyl group denoted by $R^{12}$ desirably ranges from 1 to 4. Keeping the number of carbon atoms of the alkyl group denoted by $R^{12}$ within this range can make it possible to further enhance dispersibility while maintaining solubility.

$Y^1$ denotes an alicyclic condensed cyclic group. The alicyclic condensed cyclic group denoted by $Y^1$ is desirably seven to ten-membered. Specific examples of desirable condensed cyclic groups are adamantyl groups, norbornyl groups, and dicyclopentanyl groups.

Above-described structural unit [1] can be derived from the vinyl monomer denoted by general formula [1'] below, and structural unit [4] can be derived from the acrylic monomer denoted by general formula [4'] below.

General formula [1′]
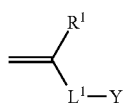
(In general formula [1′], each of $R^1$, $L^1$, and Y is defined as in general formula [1].)
General formula [4′]
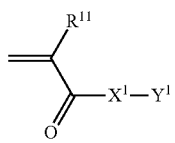
(In general formula [4′], each of $R^{11}$, $X^1$, and $Y^1$ is defined as in general formula [4].)
Specific examples of the monomers denoted by general formula [1′] and general formula [4′] are given below. However, the present invention is not limited thereto.
A-1
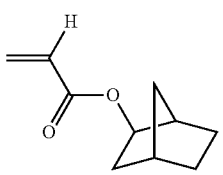
A-2
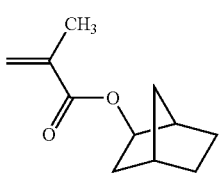
A-3
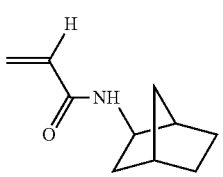
A-4
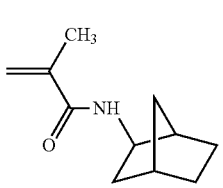
A-5
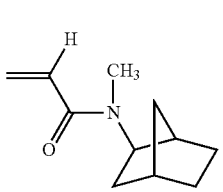
A-6
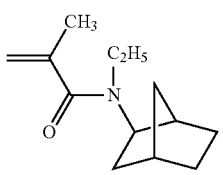
A-7
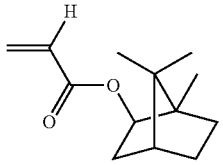
A-8
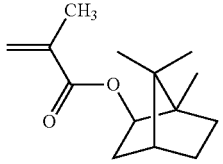
A-9
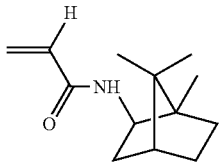
A-10
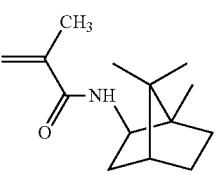
A-11
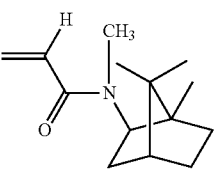
A-12
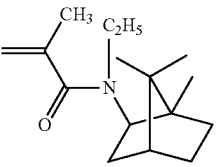
A-13
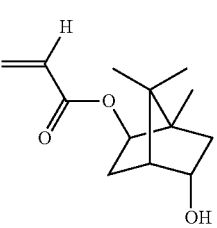

A-14 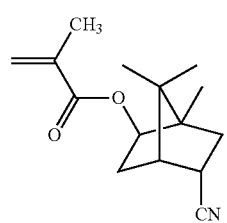
A-15 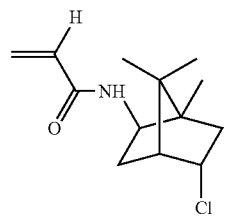
A-16 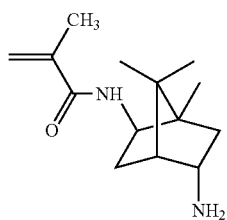
A-17 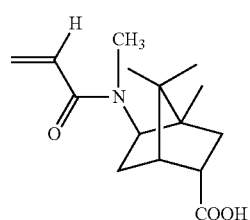
A-18 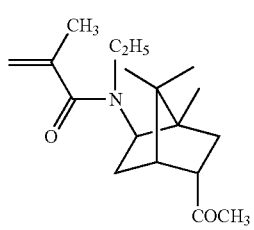
A-19 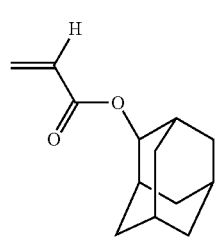
A-20 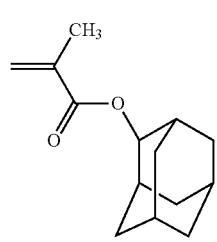
A-21 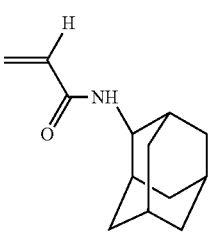
A-22 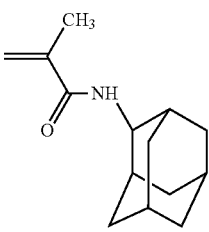
A-23 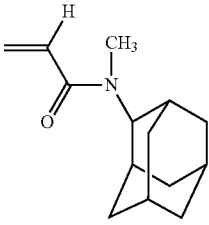
A-24 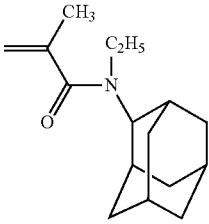
A-25 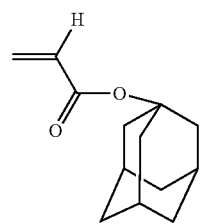
A-26 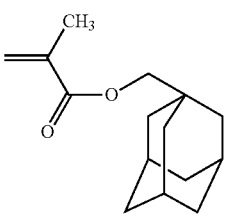

A-27
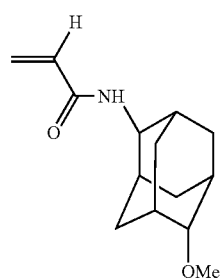
A-28
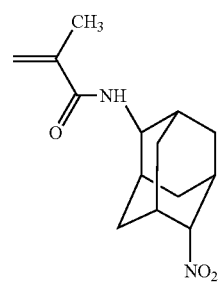
A-29
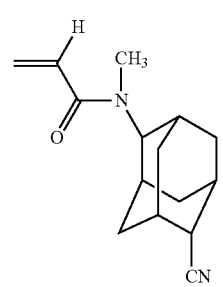
A-30
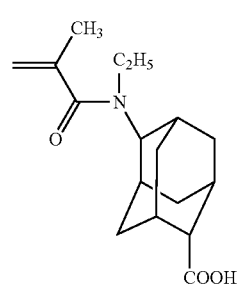
A-31
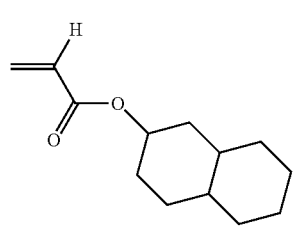
A-32
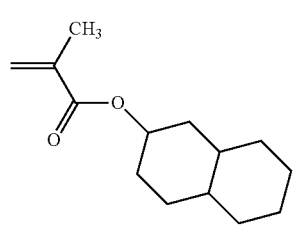
A-33
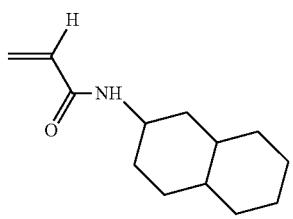
A-34
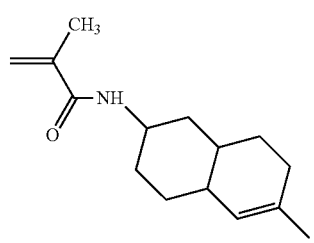
A-35
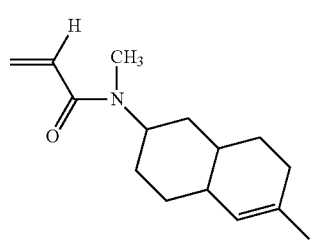
A-36
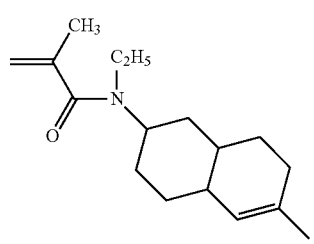
A-37
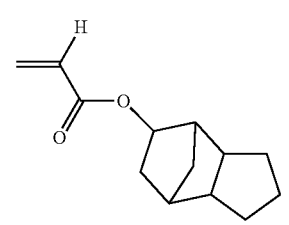
A-38
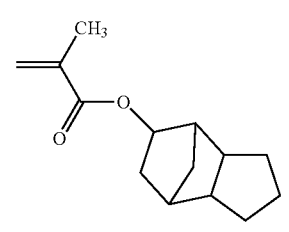
A-39
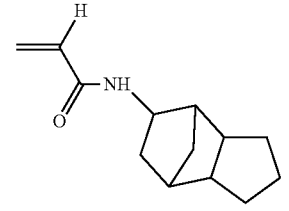

-continued

A-40, A-41, A-42, A-43, A-44, A-45, A-46, A-47, A-48, A-49, A-50, A-51, A-52

-continued

A-53 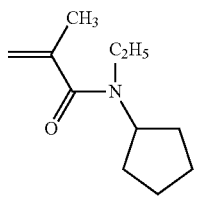

A-54 Structural Unit [2]

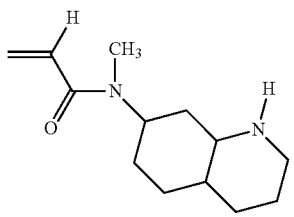
A-52

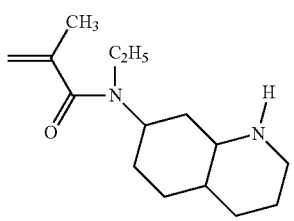
A-53

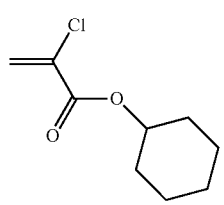
A-55

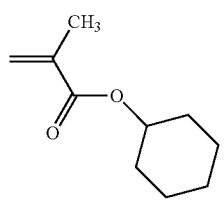
A-56

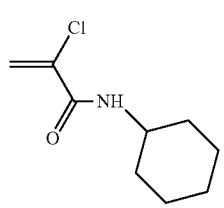
A-57

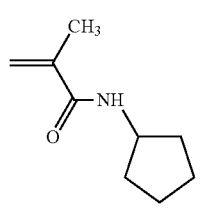
A-58

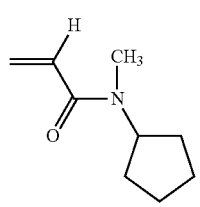
A-59

A-60

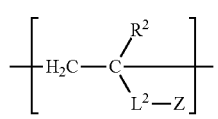

General formula [2]

In general formula [2], $R^2$ denotes a hydrogen atom, a halogen atom, or a methyl group. The details are as set forth for $R^1$ in general formula [1] above.

In general formula [2], $L^2$ denotes a single bond or a divalent linking group, with a linking group comprising an oxygen atom, nitrogen atom, or sulfur atom being desirable. A single bond or a divalent linking group bonded through a —C(O)— group to a carbon atom on the main chain is desirable as $L^2$, and the divalent linking group denoted by —C(O)X²— in general formula [5] described further below is preferred.

In general formula [2], Z denotes a hydrocarbon group with a carbon number ranging from 8 to 50. The hydrocarbon group is a saturated or unsaturated linear, branched, or cyclic saturated or unsaturated hydrocarbon group. A linear or branched hydrocarbon group is preferred. Having a carbon number of equal to or more than 8 can make it possible to contribute to dispersibility, and having a carbon number of equal to or less than 50 can ensure solubility. From the perspectives of dispersibility and solubility, the carbon number of the hydrocarbon group desirably ranges from 12 to 30. The hydrocarbon group denoted by Z is preferably an alkyl group with a carbon number ranging from 12 to 30, and is preferably an alkyl group with a carbon number ranging from 12 to 18.

From the perspective of enhancing dispersibility, structural unit [2] is desirably the structural unit denoted by general formula [5] below (structural unit [5]).

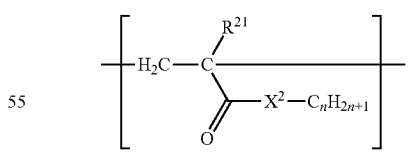

General formula [5]

In general formula [5], $R^{21}$ denotes a hydrogen atom or a methyl group, and desirably denotes a methyl group.

n denotes an integer ranging from 12 to 30, preferably an integer ranging from 12 to 18.

$X^2$ denotes a divalent linking group represented by —(O)$m^1$-, —(S)$m^2$-, or —{N($R^{22}$)}$m^3$-, and desirably denotes the divalent linking group represented by —(O)$m^1$-. Each of $m^1$, $m^2$, and $m^3$ independently denotes an integer of equal to or greater than 1.

$R^{22}$ denotes an optionally substituted alkyl group with a carbon number ranging from 1 to 8. The carbon number of the alkyl group denoted by $R^{22}$ desirably ranges from 1 to 4. Keeping the number of carbon atoms of the alkyl group denoted by $R^{22}$ within this range can further enhance dispersibility while maintaining solubility.

From the perspective of maintaining solubility, each of $m^1$, $m^2$, and $m^3$ desirably denotes an integer of equal to or lower than 5.

Above-described structural unit [2] can be derived from the vinyl monomer denoted by general formula [2'] below, and structural unit [5] can be derived from the acrylic monomer denoted by general formula [5'] below.

General formula [2']

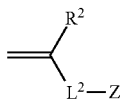

(In general formula [2'], each of $R^2$, $L^2$, and Z is defined as in general formula [2].)

General formula [5']

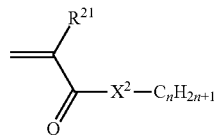

(In general formula [5'], each of $R^{21}$, $X^2$, and n is defined as in general formula [5].)

Specific examples of the monomers denoted by general formula [2'] and general formula [5'] are given below. However, the present invention is not limited thereto.

B-1
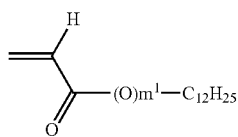

B-2
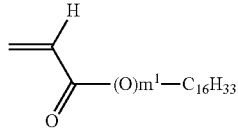

B-3
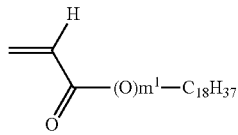

B-4
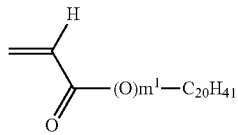

B-5
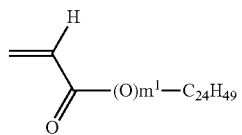

B-6
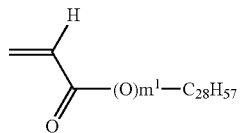

B-7
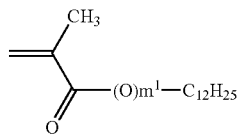

B-8
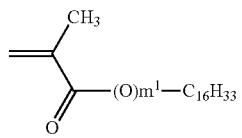

B-9
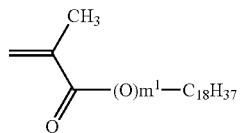

B-10
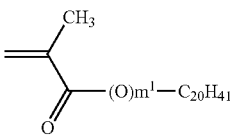

B-11
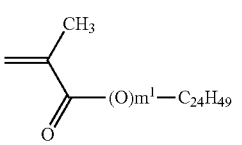

B-12
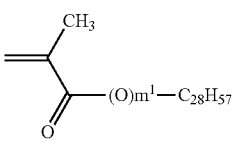

B-13
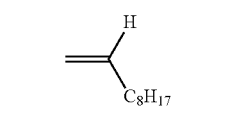

B-14
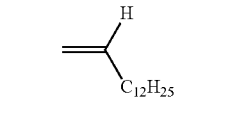

B-15
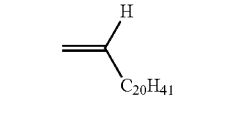

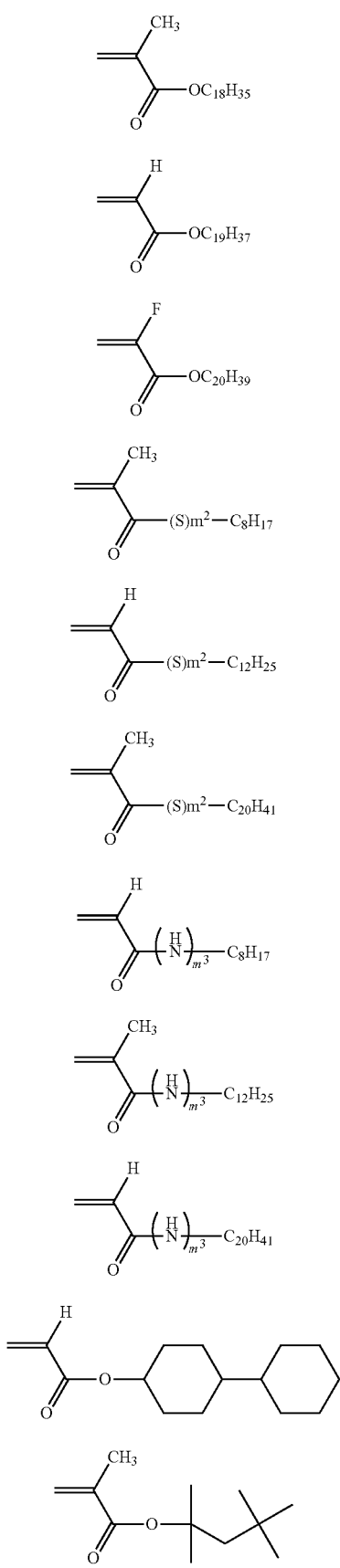

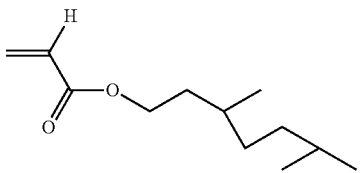
B-27

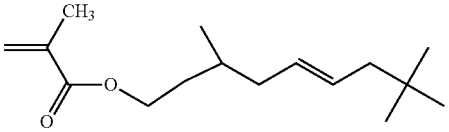
B-28

Structural Unit [3]

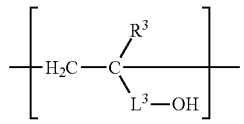
General formula [3]

In general formula [3], $R^3$ denotes a hydrogen atom, a halogen atom, or a methyl group. The details are as set forth for $R^1$ in general formula [1] above.

In general formula [3], $L^3$ denotes a single bond or a divalent linking group, with a linking group comprising an oxygen atom, nitrogen atom, or sulfur atom being preferred. Since structural unit [1], structural unit [2], and structural unit [3] are mutually different structures, the $L^3$ in general formula [3] does not contain groups corresponding to Y and Z described above. The divalent linking group denoted by $L^3$ is desirably one that is bonded through a —C(O)— group to a carbon atom on the main chain, and is preferably the divalent linking group denoted by —C(O)$X^3R^{32}$— in general formula [6] described further below.

From the perspective of enhancing dispersibility, structural unit [3] is desirably the structural unit denoted by general formula [6] below (structural unit [6]).

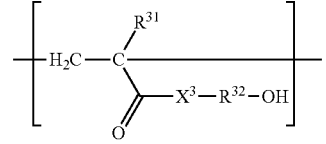
General formula [6]

In general formula [6], $R^{31}$ denotes a hydrogen atom or a methyl group, desirably a methyl group.

$X^3$ denotes —O—, —S—, or the divalent linking group denoted by —N($R^{33}$)—, desirably —O—.

$R^{33}$ denotes a hydrogen atom or an optionally substituted alkyl group with a carbon number ranging from 1 to 8. The carbon number of the alkyl group denoted by $R^{33}$ desirably ranges from 1 to 4. Keeping the number of carbon atoms of the alkyl group denoted by $R^{33}$ to within this range can further enhance dispersibility while maintaining solubility.

$R^{32}$ denotes an optionally substituted alkylene group with a carbon number ranging from 2 to 8 or a divalent group in which multiple such alkylene groups are linked through linking groups. Keeping the number of carbon atoms of the alkylene group contained in the group denoted by $R^{32}$ to within this range can further enhance dispersibility while maintaining solubility. The linking group linking the alkylene group is desirably an ester bond from the perspective of solubility. The number of alkylene groups with a carbon number ranging from 2 to 8 that are contained in the group denoted by $R^{32}$ is desirably equal to or more than 1 but equal to or less than 3.

Above-described structural group [3] can be derived from the vinyl monomer denoted by general formula [3'] below, and structural unit [6] can be derived from the acrylic monomer denoted by general formula [6'] below.

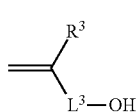

General formula [3']

(In general formula [3'], each of $R^3$ and $L^3$ is defined as in general formula [3].)

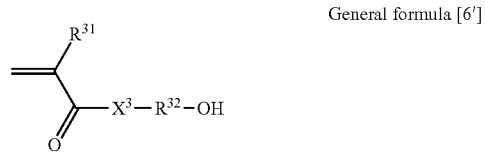

General formula [6']

(In general formula [6'], each of $R^{31}$, $R^{32}$, and $X^3$ is defined as in general formula [3].)

The following monomers are specific examples of monomers denoted by general formula [3'] or [6'] (however, the present invention is not limited to these specific examples): hydroxyalkyl(meth)acrylates such as hydroxyethyl(meth)acrylate, hydroxypropyl(meth)acrylate, polyethylene glycol mono(meth)acrylate, polypropylene glycol mono(meth)acrylate, polyethylene glycol polypropylene glycol mono(meth)acrylate, glycerol mono(meth)acrylate, and 3-chloro-2-hydroxypropyl(meth)acrylate; vinyl ethers such as hydroxyethyl vinyl ether, hydroxypropyl vinyl ether, and hydroxybutyl vinyl ether; (meth)allyl ethers such as hydroxyethyl mono(meth)allyl ether, hydroxypropyl mono(meth)allyl ether, hydroxybutyl mono(meth)allyl ether, diethylene glycol mono(meth)allyl ether, dipropylene glycol mono(meth)allyl ether, glycerin mono(meth)allyl ether, and 3-chloro-2-hydroxypropyl(meth)allyl ether; and (meth)allyl alcohol.

In the binder of the present invention, the hydroxyl group contained in structural unit [3] is capable of forming a crosslinked structure with a crosslinking agent such as polyisocyanate employed as a curing agent in magnetic recording media. Thus, a magnetic recording medium of high coating strength can be obtained. The details of the polyisocyanate curing agent employed are given further below.

From the perspective of achieving both good dispersion and high coating strength, the binder of the present invention in the form of a vinyl copolymer desirably comprises equal to or greater than 5 molar percent but equal to or less than 75 molar percent, preferably comprises equal to or greater than 15 molar percent but equal to or less than 60 molar percent, and more preferably, comprises equal to or greater than 30 molar percent but equal to or less than 50 molar percent of structural unit [1] (desirably structural unit [4]) based on all polymerization units constituting the copolymer.

Similarly, from the perspective of achieving both good dispersion and high coating strength, the binder of the present invention desirably comprises equal to or greater than 5 molar percent but equal to or less than 75 molar percent, preferably equal to or greater than 5 molar percent but equal to or less than 50 molar percent, and more preferably, equal to or greater than 10 molar percent but equal to or less than 30 molar percent of structural unit [2] (desirably structural unit [5]), and desirably comprises equal to or greater than 5 molar percent but equal to or less than 80 molar percent, preferably equal to or greater than 15 molar percent but equal to or less than 70 molar percent, and more preferably, equal to or greater than 30 molar percent but equal to or less than 60 molar percent of structural unit (3) (desirably structural unit [6]) based on all polymerization units. Accordingly, the blending ratio of each monomer during the polymerization reaction is desirably established to obtain a copolymer having the above desirable composition.

Other than the above monomers for introducing the structural units that can also be present, examples of monomers that are copolymerizable with the monomers to obtain the binder of the present invention are ethylenic unsaturated carboxylic ester monomers, aromatic vinyl monomers, ethylenic unsaturated nitrile monomers, alkyl vinyl ether monomers, vinyl ester monomers, and ethylenic unsaturated polyvalent carboxylic anhydrides.

Examples of ethylenic unsaturated carboxylic ester monomers are alkyl(meth)acrylate monomers and alkoxyalkyl(meth)acrylate monomers.

Examples of alkyl(meth)acrylate monomers are: methyl(meth)acrylate, ethyl(meth)acrylate, propyl(meth)acrylate, butyl(meth)acrylate, isobutyl(meth)acrylate, pentyl(meth)acrylate, hexyl(meth)acrylate, octyl(meth)acrylate, 2-ethylhexyl(meth)acrylate, lauryl(meth)acrylate, stearyl(meth)acrylate, and cyclohexyl(meth)acrylate. Of these, methyl(meth)acrylate is desirable.

The alkyl group of the alkyl(meth)acrylate monomer may comprise a substituent, and is desirably an aralkyl group. Specific examples of such compounds are: benzyl(meth)acrylate, phenoxyethyl(meth)acrylate, phenoxypolyethylene glycol(meth)acrylate, and nonylphenolethylene oxide adduct (meth)acrylate. Of these, benzyl(meth)acrylate and phenoxyethyl(meth)acrylate are desirable.

Examples of alkoxyalkyl(meth)acrylate monomers are methoxyethyl(meth)acrylate and butoxyethyl(meth)acrylate. An example of an ethylenic unsaturated carboxylic ester monomer is glycidyl(meth)acrylate.

Examples of aromatic vinyl monomers are styrene, α-methyl styrene, vinyl toluene, monochlorostyrene, p-methyl styrene, and hydroxymethyl styrene.

Examples of ethylenic unsaturated nitrile monomers are acrylonitrile, methacrylonitrile, 2-ethylpropenenitrile, 2-propylpropenenitrile, 2-chloropropenenitrile, and 2-butenenitrile.

Examples of alkyl vinyl ether monomers are allyl glycidyl ether, methyl vinyl ether, ethyl vinyl ether, isobutyl vinyl ether, n-butyl vinyl ether, 2-ethylhexyl vinyl ether, n-octyl vinyl ether, lauryl vinyl ether, cetyl vinyl ether, and stearyl vinyl ether.

Examples of vinyl ester monomers are vinyl formate, vinyl acetate, vinyl propionate, isopropenyl acetate, vinyl valerate, vinyl caprate, vinyl laurate, vinyl stearate, vinyl benzoate, vinyl versatate, and vinyl pivalate.

Examples of ethylenic unsaturated polyvalent carboxylic anhydrides are maleic anhydride and itaconic anhydride.

The above copolymerizable monomers can be employed singly or in combinations of two or more.

Of these monomers, the ethylenic unsaturated carboxylic acid monomers are desirable and the alkyl(meth)acrylate monomers are preferred.

The various monomers used to obtain the binder of the present invention can all be synthesized by known methods or are available as commercial products. For example, the vinyl monomer denoted by general formula [G'] for introducing structural unit [G] can be manufactured readily and at high yield by known methods such as the method described on page 57 of *Micromonomer Chemistry and Industry* (IPC Publishing Department), which is expressly incorporated herein by reference in its entirety.

To obtain the binder of the present invention, it is desirable to employ a known polymerization method such as solution polymerization to polymerize the polymerization reaction system optionally including the copolymerizable compounds as set forth above.

From the perspective of reactivity, it is desirable to employ a water-miscible polar solvent in solution polymerization. In the present invention, the term "water-miscible polar solvent" refers to a solvent that dissolves equal to or more than 5 weight percent of water at 20° C. Specific examples of such solvents are dimethylformamide (DMF), dimethylacetamide (DMAC), and N-methylpyrrolidone (NMP). The polymerization reaction can be conducted in the presence of a known polymerization initiator, chain transfer agent, or the like. The polymerization conditions will vary with the type of polymerizable compound, polymerization initiator, chain transfer agent, and the like. Generally, a temperature of about 50 to 80° C., a gage pressure of about 4.0 to 1.0 MPa, and a time of about 5 to 30 hours are desirable in an autoclave. Polymerization is desirably conducted in an atmosphere of a gas that is inert to the reaction from the perspective of ease of controlling the reaction. Examples of such gases are nitrogen and argon. In terms of cost, nitrogen is desirably employed. In the course of polymerization, other components that are generally added to polymerization reactions can be added to the polymerization reaction system in addition to the above-described components.

The weight average molecular weight of the vinyl copolymer that is the binder of the present invention is desirably equal to or higher than 1,000 from the perspective of obtaining a high-strength coating, and is desirably equal to or lower than 200,000 from the perspective of a suitable coating material viscosity at a prescribed concentration for maintaining good working properties. From these perspectives, the weight average molecular weight of the vinyl copolymer that is the binder of the present invention is preferably 10,000 to 100,000. In the present invention, the "average molecular weight" refers to a value that is obtained by standard polystyrene conversion. The molecular weight of the binder of the present invention can be controlled by means of the starting material composition, reaction conditions, and the like.

Specific examples of the binder of the present invention are given below. However, the present invention is not limited to the specific examples given below. Mw denotes the weight average molecular weight and the numeric values positioned to the right of the various structural units denote the molar ratios of the various structural units relative to all polymerization units in the copolymers below.

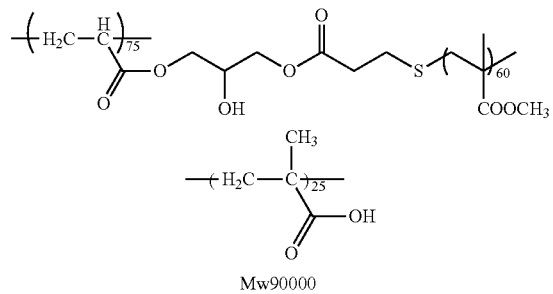

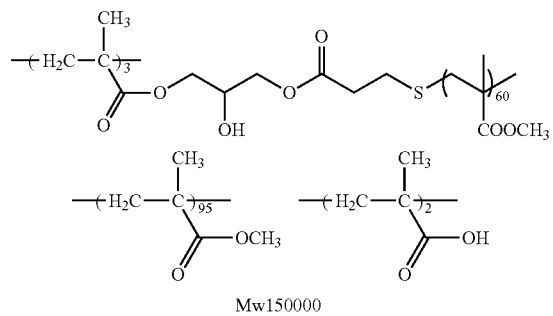

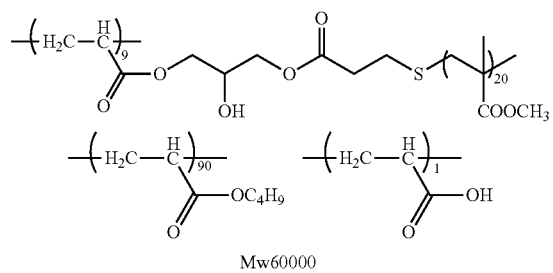

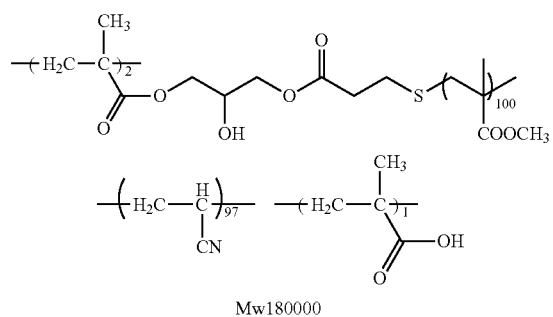

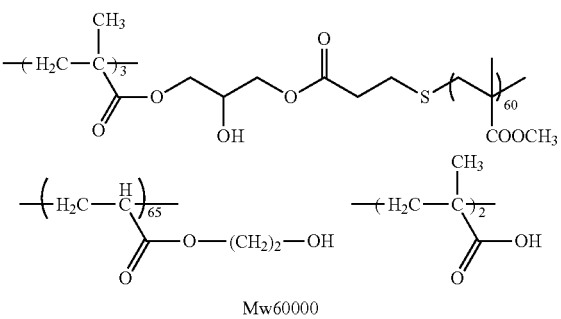

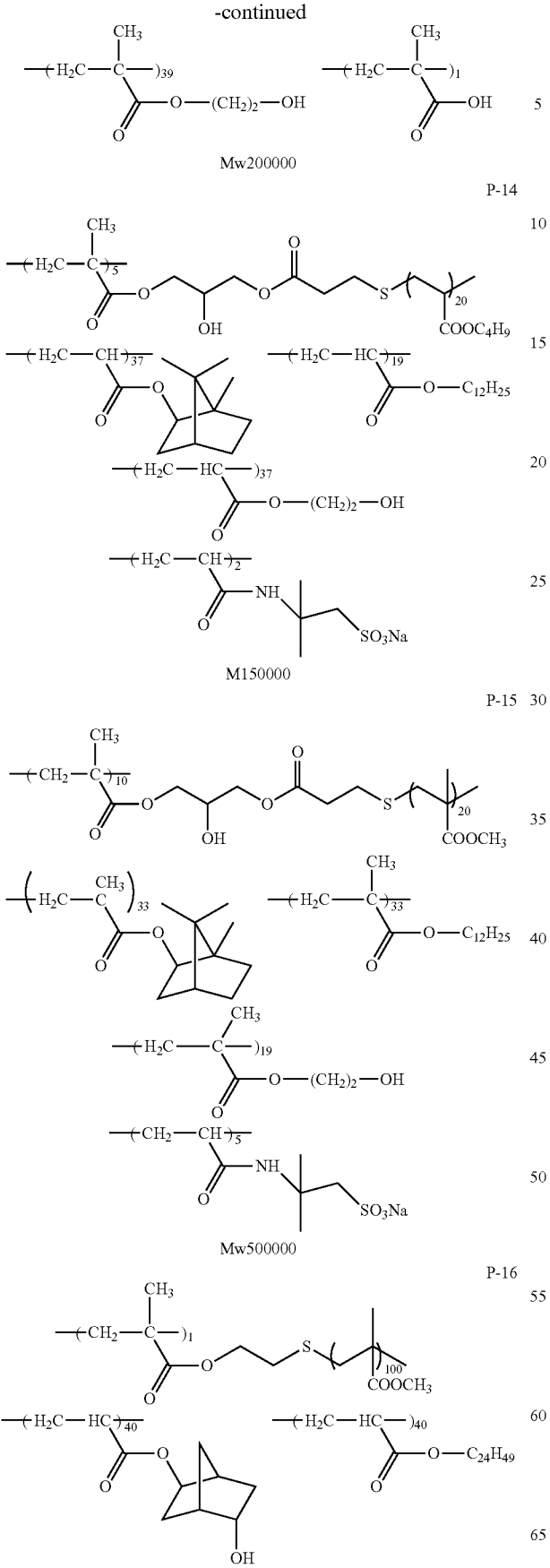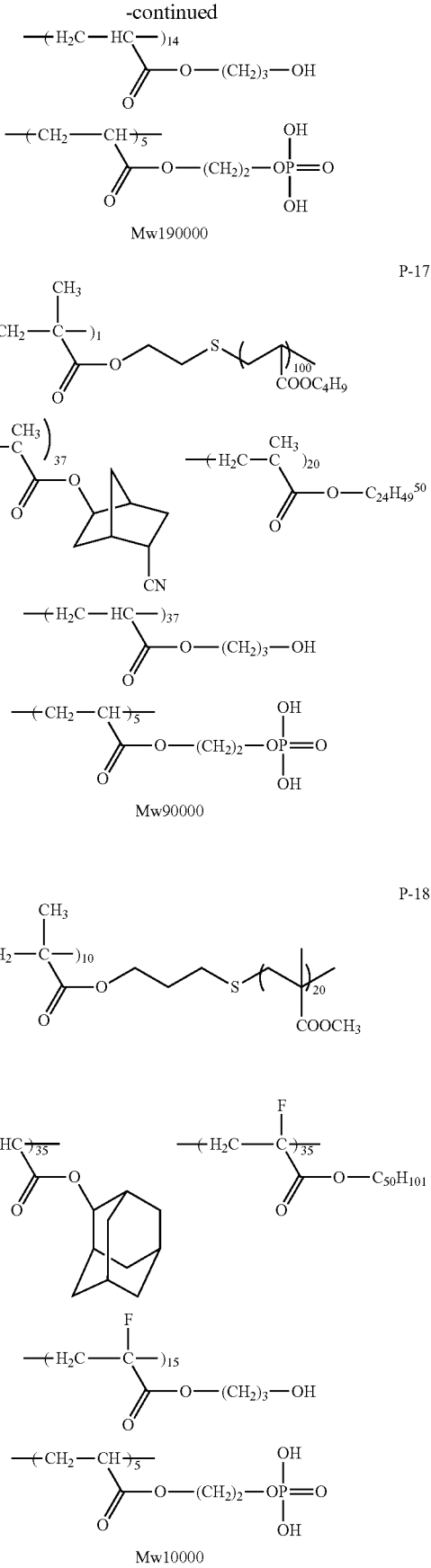

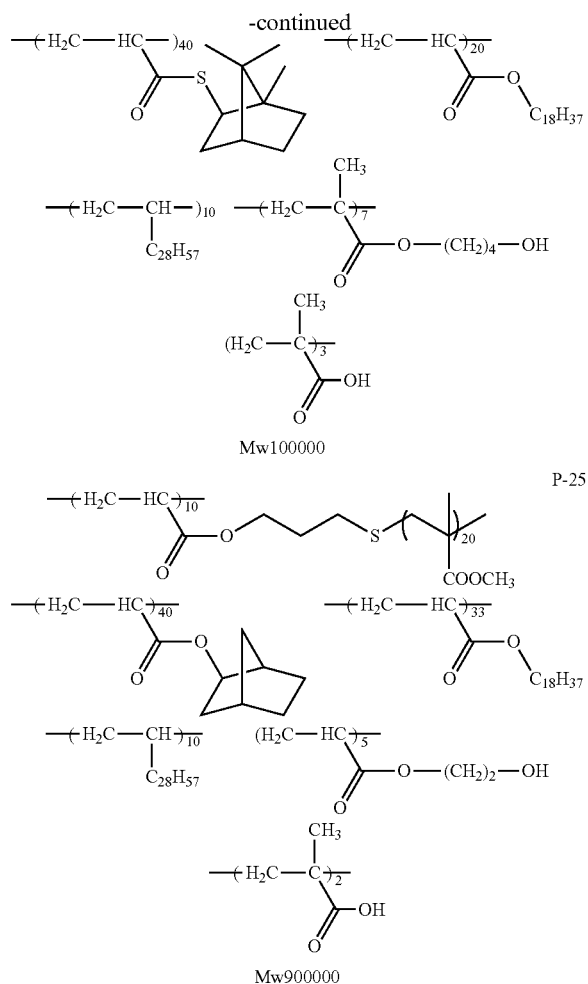

The binder composition of the present invention contains the binder of the present invention and is desirably a composition for forming a particulate magnetic recording medium. Specifically, it is the composition of the binder resin that is employed to manufacture a coating liquid for forming the powder-containing layers of a particulate magnetic recording medium, such as a magnetic layer containing a ferromagnetic powder and a nonmagnetic layer containing a nonmagnetic powder. Powder-containing layers having a high degree of surface smoothness can be formed by dispersing various powders to a high degree by means of the binder of the present invention. Accordingly, the binder composition of the present invention, which contains the binder of the present invention, can permit the formation of a magnetic recording medium that is imparted with excellent electromagnetic characteristics by means of high surface smoothness.

As set forth above, use of the binder of the present invention in combination with polyisocyanate can yield a magnetic recording medium of high coating strength. Accordingly, the binder composition of the present invention desirably comprises a polyisocyanate. Examples of polyisocyanates are isocyanates such as trilene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, and triphenylmethane triisocyanate; products of these isocyanates and polyalcohols; polyisocyanates produced by the condensation of isocyanates; and other bifunctional or greater polyisocyanates.

Examples of product names of these isocyanates that are currently available are: Coronate L, Coronate HL, Coronate 2030, Coronate 2031, Millionate MR, and Millionate MTL made by Nippon Polyurethane Industry Co., Ltd.; Takenate D-102, Takenate D-110N, Takenate D-200, and Takenate D-202 made by Takeda Chemical Industries, Ltd.; and Desmodule L, Desmodule IL, Desmodule N, and Desmodule HL manufactured by Sumitomo Bayer Co., Ltd. They can be used in each layer singly or in combinations of two or more by exploiting differences in curing reactivity.

From the perspective of enhancing coating strength, it is desirable to employ a polyisocyanate in the form of a trifunctional or greater polyisocyanate. Specific examples of trifunctional and greater polyisocyanates are adduct polyisocyanate compounds such as the compound obtained by adding three mols of trilene diisocyanate (TDI) to trimethylol propane (TMP), the compound obtained by adding 3 mols of hexamethylene diisocyanate (HDI) to TMP, the compound obtained by adding 3 mols of isophorone diisocyanate (IPDI) to TMP, and the compound obtained by adding xylylene diisocyanate (XDI) to TMP; condensed isocyanurate trimers of TDI; condensed isocyanurate pentamers of TDI; condensed isocyanurate heptamers of TDI; mixtures thereof; isocyanurate condensation products of HDI; isocyanurate condensation products of IPDI; and crude MDI. The quantity of polyisocyanate employed is, for example, 0 to 80 weight parts per 100 weight parts of the binder of the present invention; from the perspective of enhancing coating strength, 50 to 80 weight parts are desirable.

The binder composition of the present invention can contain various additives and the like that are commonly employed in coating liquids for forming magnetic recording media in addition to the binder of the present invention and a polyisocyanate. Magnetic powder, nonmagnetic powder, and the like can be contained in the binder composition of the present invention, or the composition can be mixed with these powders for use.

The details of the various components described above are as set forth further below for the magnetic recording medium of the present invention.

Magnetic Recording Medium

In one aspect, the magnetic recording medium of the present invention comprises a magnetic layer comprising a ferromagnetic powder and a binder on a nonmagnetic support, and comprises the binder of the present invention as the constituent component of the binder in the magnetic layer. In another aspect, the magnetic recording medium of the present invention comprises a nonmagnetic layer comprising a nonmagnetic powder and a binder and a magnetic layer comprising a ferromagnetic powder and a binder in this order on a nonmagnetic support, and comprises the binder of the present invention as the constituent component of the binder in the magnetic layer and/or in the nonmagnetic layer.

The magnetic recording medium of the present invention comprises the binder of the present invention as a constituent component of the binder in the magnetic layer and/or nonmagnetic layer. The phrase "comprises the binder . . . as a constituent component" means that the binder of the present invention itself, or a binder in the form of a reaction product of the binder of the present invention and another binder component, is contained. The reaction product is desirably contained as the reaction product of the binder of the present invention (vinyl copolymer) and a polyisocyanate, as set forth above. The incorporation of such a reaction product can further increase the coating strength.

The magnetic recording medium of the present invention can contain known thermoplastic resins, thermosetting resins, reactive resins, and mixtures thereof in addition to the binder of the present invention as constituent components of the binder in the magnetic layer and/or nonmagnetic layer. However, high running durability that is capable of withstanding repeated running can be achieved without the use of a resin component, such as a polyurethane resin, in addition to the binder of the present invention (vinyl copolymer).

Examples of resin components in addition to the binder of the present invention are thermoplastic resins with a glass transition temperature of −100 to 150° C. and a number average molecular weight of 1,000 to 200,000, desirably 10,000 to 100,000. Specific examples are copolymers containing structural units in the form of polyurethane resin, vinyl butyral, vinyl acetal, vinyl ether, and the like; and various rubber-based resins. Examples of thermosetting resins and reactive resins are phenol resin, phenoxy resin, epoxy resin, urea resin, melamine resin, alkyd resin, formaldehyde resin, silicone resin, epoxy-polyamide resin, and mixtures of polyester resin and isocyanate prepolymers. In the magnetic recording medium of the present invention, in layers not containing the binder of the present invention, these known resins can be combined as desired with polyisocyanate and employed as binders. In layers containing the binder of the present invention with another resin and polyisocyanate, a reaction product in which the binder of the present invention and another resin are crosslinked by polyisocyanate can be incorporated as a constituent component of the binder.

When employing the binder of the present invention with another resin component, the other resin component is desirably employed in a quantity of 1 to 100 weight parts, preferably 10 to 100 weight parts, per 100 weight parts of the binder of the present invention. However, as set forth above, a magnetic recording medium of high coating strength can be obtained with the binder of the present invention even when no other resin component is incorporated.

The binder of the present invention is desirably employed within a range of 5 to 50 weight parts, preferably within a range of 7 to 45 weight parts, per 100 weight parts of powder such as ferromagnetic powder and nonmagnetic powder. Use of the binder of the present invention in a quantity falling within this range relative to the various powders can enhance the dispersion of the powders. A good state of dispersion of powder in the magnetic recording medium can be confirmed by an increase in the surface smoothness of the magnetic recording medium. Further, the fact of a good state of dispersion of the ferromagnetic powder or nonmagnetic powder can be confirmed by exhibition of the phenomenon of a high degree of luster on the surface of the magnetic layer or nonmagnetic layer. Still further, use of the binder of the present invention in a quantity of 10 to 40 weight parts per 100 weight parts of powder can markedly improve electromagnetic characteristics. A content of the binder of the present invention of equal to or greater than 5 weight parts per 100 weight parts of powder is desirable in that the ferromagnetic powder or nonmagnetic powder does not bind together and powder dropout and the like do not occur. The greater the quantity of binder in the magnetic layer, the lower the fill rate of the ferromagnetic powder and the poorer the electromagnetic characteristics. The quantity of the binder of the present invention is desirably equal to or less than 50 weight parts per 100 weight parts of ferromagnetic powder in the magnetic layer because the decrease in the fill rate of the ferromagnetic powder in the magnetic layer can diminish.

The magnetic recording medium of the present invention will be described in greater detail below.

(Magnetic Layer)

In the magnetic recording medium of the present invention, the ferromagnetic powder contained in the magnetic layer can be a hexagonal ferrite powder. With regard to the size of the hexagonal ferrite powder, particularly when employing a magnetoresistive head in reproduction to increase a track density, an average plate diameter equal to or less than 50 nm is desirable to reduce noise. An average plate diameter equal to or higher than 10 nm can yield stable magnetization without the effects of thermal fluctuation. An average plate diameter equal to or less than 200 nm can permit low noise and is suited to the high-density magnetic recording. Accordingly, the average plate diameter of the hexagonal ferrite powder desirably ranges from 10 nm to 200 nm, preferably 10 nm to 50 nm. Microparticulate hexagonal ferrite powder having an average plate diameter within the above-stated range can be highly dispersed by means of the binder of the present invention. The average plate ratio (plate diameter/plate thickness) of the hexagonal ferrite powder preferably ranges from 1 to 15, more preferably from 1 to 7. Low plate ratio is preferable to achieve high filling property of the magnetic layer, but sometimes adequate orientation is not achieved. When the plate ratio is higher than 15, noise may be increased due to stacking between particles. The specific surface area by BET method of the hexagonal ferrite powders having such particle sizes normally ranges from 10 to 200 m$^2$/g, almost correspondently to an arithmetic value from the particle plate diameter and the plate thickness. Narrow distributions of particle plate diameter and thickness are normally good. Although difficult to render in number form, about 500 particles can be randomly measured in a transmission electron microscope (TEM) photograph of particles to make a comparison. This distribution is often not a normal distribution. However, when the distribution is expressed as the standard deviation σ to the average particle size, σ/average particle size=0.1 to 2.0. The particle producing reaction system is rendered as uniform as possible and the particles produced are subjected to a distribution-enhancing treatment to achieve a narrow particle size distribution. For example, methods such as selectively dissolving ultrafine particles in an acid solution by dissolution are known.

A coercivity (Hc) of the hexagonal ferrite powder of about 500 to 5,000 Oe (about 40 to 398 kA/m) can normally be achieved. A high coercivity (Hc) is advantageous for high-density recording, but this is limited by the capacity of the recording head. The hexagonal ferrite powder employed in the present invention preferably has a coercivity (Hc) ranging from 2,000 to 4,000 Oe (about 160 to 320 kA/m), more preferably 2,200 to 3,500 Oe (about 176 to 280 kA/m). When the saturation magnetization of the head exceeds 1.4 tesla, the hexagonal ferrite having a coercivity (Hc) of equal to or higher than 2,200 Oe (about equal to or higher than 176 kA/m) is preferably employed. The coercivity (Hc) can be controlled by particle size (plate diameter and plate thickness), the types and quantities of elements contained, substitution sites of the element, the particle producing reaction conditions, and the like. The saturation magnetization ($\sigma_s$) can be 40 to 80 A·m$^2$/kg. The higher saturation magnetization ($\sigma_s$) is preferred, however, it tends to decrease with decreasing particle size. Known methods of improving saturation magnetization ($\sigma_s$) are combining spinel ferrite with magnetoplumbite ferrite, selection of the type and quantity of elements incorporated, and the like. It is also possible to employ W-type hexagonal ferrite.

For details of the hexagonal ferrite powder described above, reference can also be made to paragraphs [0042] and

[0043] of Japanese Unexamined Patent Publication (KOKAI) No. 2004-295926, which is expressly incorporated herein by reference in its entirety.

The ferromagnetic metal powder is also the example of the ferromagnetic powder contained in the magnetic layer. With regard to the size of the ferromagnetic metal powder, the average major axis length ranging from 10 nm to 100 nm is desirable, with 20 nm to 50 nm being preferable, from the perspective of magnetization stability and reduction of noise. Microparticulate ferromagnetic metal powder having an average major axis length within the above-stated range can be highly dispersed by means of the binder of the present invention.

The specific surface area ($S_{BET}$) by BET method of the ferromagnetic metal powder is desirably equal to or greater than 30 m$^2$/g but less than 80 m$^2$/g, preferably equal to or greater than 40 m$^2$/g but equal to or less than 70 m$^2$/g, from the perspective of achieving good surface property and reduction of noise.

The coercivity (Hc) of the ferromagnetic metal powder desirably ranges from 1,500 to 7,000 Oe (about 119 to 557 kA/m), preferably from 2,000 to 6,000 Oe (about 159 to 478 kA/m), and the as desirably ranges from 80 to 170 emu/g (about 80 to 170 A·m$^2$/kg), preferably from 90 to 160 emu/g (about 90 to 160 A·m$^2$/kg).

The pH of the ferromagnetic metal powder is desirably optimized depending on the type of binder employed together. A pH range of 4 to 12 can be established, with 6 to 10 being preferred. As needed, the ferromagnetic metal powder can be surface treated with Al, Si, P, or an oxide thereof. The quantity of surface treatment can be set to 0.1 to 10 weight percent of the ferromagnetic metal powder. When applying a surface treatment, the quantity of a lubricant such as a fatty acid that is adsorbed is desirably not greater than 100 mg/m$^2$. The ferromagnetic metal powder will sometimes contain inorganic ions such as soluble Na, Ca, Fe, Ni, or Sr. These are desirably substantially not present in the ferromagnetic metal powder, but seldom affect characteristics at 200 ppm or less. The ferromagnetic metal powder employed in the present invention desirably has few voids; the void level is preferably 20 volume percent or less, more preferably 5 volume percent or less. As stated above, so long as the particle size characteristics are satisfied, the ferromagnetic metal powder may be acicular, granular, rice grain-shaped, or plate-shaped. Acicular ferromagnetic powder is desirably employed. With regard to the acicular ferromagnetic metal powder, the acicular ratio desirably ranges from 4 to 12, preferably from 5 to 12.

For the remaining details of the ferromagnetic metal powder, reference can also be made to paragraphs [0033] to [0035] of Japanese Unexamined Patent Publication (KOKAI) No. 2004-295926, which is expressly incorporated herein by reference in its entirety.

The average particle size of the ferromagnetic powder can be measured by the following method.

Particles of ferromagnetic powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle sizes measured by the above method is adopted as an average particle size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

(Nonmagnetic Layer)

In one aspect of the magnetic recording medium of the present invention, there is a nonmagnetic layer comprising a nonmagnetic powder and a binder between the nonmagnetic support and magnetic layer, and the binder in the magnetic layer and/or nonmagnetic layer contains the binder of the present invention as a constituent component. The binder of the present invention can contribute to enhancing the dispersibility of the nonmagnetic powder and to increasing the coating strength in the nonmagnetic layer in the same manner as in the magnetic layer.

Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped. The average particle diameter of the nonmagnetic powder desirably ranges from 0.005 μm to 2 μm, preferably from 0.01 μm to 0.2 μm. As needed, nonmagnetic powders of differing average particle diameter may be combined; the same effect may be achieved by broadening the average particle distribution of a single nonmagnetic powder. The crystallite size of the nonmagnetic powder desirably ranges from 0.004 μm to 1 μm, preferably from 0.04 μm to 0.1 μm. The specific surface area of the nonmagnetic powder desirably ranges from 1 to 100 m$^2$/g, preferably from 5 to 70 m$^2$/g, and more preferably from 10 to 65 m$^2$/g. Microparticulate nonmagnetic powder having the above-stated size can be highly dispersed by means of the binder of the present invention.

The oil absorption capacity using dibutyl phthalate (DBP) of the nonmagnetic powder is desirably 5 to 100 mL/100 g, preferably 10 to 80 mL/100 g, and more preferably, 20 to 60 mL/100 g. The specific gravity is desirably 1 to 12, preferably 3 to 6. The tap density is desirably 0.05 to 2 g/mL, preferably 0.2 to 1.5 g/mL. At less than 0.05 g/mL, there are numerous scattering particles and handling tends to become difficult. At greater than 2 g/mL, there tends to be adhesion to the device and handling tends to become difficult. The pH of the nonmagnetic powder is desirably 2 to 11, preferably 6 to 9. When the pH falls within this range, an increase in the coefficient of friction can be suppressed.

The presence of $Al_2O_3$, $SiO_2$, $TiO_2$, $ZrO_2$, $SnO_2$, $Sb_2O_3$, and ZnO is desirable through the application of surface treatments to the surface of the nonmagnetic powders. $Al_2O_3$, $SiO_2$, $TiO_2$, and $ZrO_2$ are preferable for dispersibility, and $Al_2O_3$, $SiO_2$, and $ZrO_2$ are of still greater preference. They can be combined for use, or employed singly. Depending on the objective, a surface-treatment coating layer with a coprecipitated material may also be employed, the method which comprises a first alumina coating and a second silica coating thereover or the reverse method thereof may also be adopted. Depending on the objective, the surface-treatment coating layer may be a porous layer, with homogeneity and density being generally desirable.

For the remaining details regarding the nonmagnetic powder, reference can be made to paragraphs [0047] to [0048] and [0050] in Japanese Unexamined Patent Publication (KOKAI) No. 2004-295926, which is expressly incorporated herein by reference in its entirety.

(Additives)

Additives can be added as needed to the magnetic layer and nonmagnetic layer. Additives in the form of compounds that impart dispersing effects, leveling effects, antistatic effects, plasticizing effects, and the like can be employed. Reference can be made to paragraphs [0055] to [0060] of Japanese Unexamined Patent Publication (KOKAI) No. 2004-295926 for details regarding compounds that can be employed as additives, which is expressly incorporated herein by reference in its entirety.

Carbon black may be added to the magnetic layer and/or nonmagnetic layer as needed. Examples of types of carbon black that are suitable for use are: furnace black for rubber, thermal for rubber, black for coloring, and acetylene black. The specific surface area is desirably 5 to 500 m$^2$/g, the DBP oil absorption capacity is desirably 10 to 400 ml/100 g, the average particle diameter is desirably 5 to 300 nm, preferably 10 to 250 nm, and more preferably, 20 to 200 nm. The pH is desirably 2 to 10, the moisture content is desirably 0.1 to 10 percent, and the tap density is desirably 0.1 to 1 g/cc. When employing carbon black, the quantity desirably ranges from 0.1 to 30 weight percent with respect to the weight of the ferromagnetic powder or the nonmagnetic powder. For example, the Carbon Black Handbook compiled by the Carbon Black Association, which is expressly incorporated herein by reference in its entirety, may be consulted for types of carbon black suitable for use in the present invention.

(Organic Solvent)

Known organic solvents can be used. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane; these may be employed in any ratio.

All or some part of the additives employed in the present invention can be added in any of the steps during the manufacturing of coating liquids for the magnetic layer and nonmagnetic layer. For example, there are cases where they are mixed with the ferromagnetic powder prior to the kneading step; cases where they are added during the step in which the ferromagnetic powder, binder, and solvent are kneaded; cases where they are added during the dispersion step; cases where they are added after dispersion; and cases where they are added directly before coating.

(Nonmagnetic Support)

Known films of the following may be employed as the nonmagnetic support: biaxially-oriented polyethylene naphthalate, polyethylene terephthalate, polyamides, polyimides, polyamidoimides, aromatic polyamides, polybenzooxazoles, and the like, with polyethylene naphthalate and aromatic polyamides being preferred. These supports may be subjected beforehand to corona discharge treatment, plasma treatment, adhesion enhancing treatment, heat treatment, and the like.

The nonmagnetic support that can be employed in the present invention desirably has good smoothness in the form of a centerline average surface roughness of 0.1 to 20 nm, preferably 1 to 10 nm at a cut-off value of 0.25 nm. These nonmagnetic supports not only are of low centerline average surface roughness, but also desirably have no coarse protrusions of 1 micrometer or greater. The arithmetic average roughness of the support obtained is desirably equal to or lower than 0.1 μm as the Ra specified in JIS B0660-1998 and ISO 4287-1997 to reduce noise.

(Layer Structure)

In the magnetic recording medium of the present invention, the thickness of the nonmagnetic support is, for example, 2 to 100 μm, desirably 3 to 80 μm. An undercoating layer for increasing adhesion or a smoothing layer to increase smoothness can be provided between the nonmagnetic support and the nonmagnetic layer or magnetic layer. The thickness of the undercoating layer and smoothing layer is, for example, 0.01 to 0.5 μm, desirably 0.02 to 0.5 μm. The magnetic recording medium of the present invention can be a disk-like medium with a nonmagnetic layer and magnetic layer provided on both sides of the support, or a tape-like medium or disk-like medium in which they are provided on just one side. In that case, a backcoat layer can be provided on the opposite side from the side on which the nonmagnetic layer and magnetic layer are provided so as to achieve antistatic, curling correction, and like effects. The thickness of the backcoat layer is, for example, 0.1 to 4 μm, desirably 0.3 to 2.0 μm. Known undercoating layers, smoothing layers, and backcoat layers can be employed. For the details, reference can be made to paragraphs [0064] to [0066] in Japanese Unexamined Patent Publication (KOKAI) No. 2004-295926, which is expressly incorporated herein by reference in its entirety. The binder of the present invention can also be incorporated into these layers in the magnetic recording medium of the present invention.

The thickness of the nonmagnetic layer is normally 0.2 to 5.0 µm, desirably 0.3 to 3.0 µm, and preferably, 0.4 to 2.0 µm.

The thickness of the magnetic layer is desirably 0.01 to 0.10 µm, preferably 0.02 to 0.08 µm, and more preferably, 0.03 to 0.08 µm. It is desirably optimized based on the saturation magnetization and head gap length of the magnetic head employed, and on the band of the recording signal. A single magnetic layer suffices, but the magnetic layer can be divided into two or more layers of differing magnetic characteristics. A known multilayer magnetic layer configuration can be employed. Generally, the thinner the magnetic layer, the lower the coating durability, and the more difficult it is to maintain good running durability. In contrast, incorporating the binder of the present invention into the magnetic layer can increase the coating strength of the magnetic layer. Thus, good running durability can be achieved in a magnetic recording medium having a thin magnetic layer with a thickness falling within the above range.

(Preparation of Coating Liquid)

The process for manufacturing coating liquids for each layer such as the magnetic layer, nonmagnetic layer and backcoat layer can comprise at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. To achieve the object of the present invention, conventionally known manufacturing techniques may be utilized for some of the steps. Further, glass beads may be employed to disperse the coating liquids for each layer, with a dispersing medium with a high specific gravity such as zirconia beads, titania beads, and steel beads being suitable for use. The particle diameter and fill ratio of these dispersing media can be optimized for use. A known dispersing device may be employed.

In the method of manufacturing a magnetic recording medium, for example, a magnetic layer can be formed by coating a magnetic layer coating liquid to a prescribed thickness on the surface of a nonmagnetic support that is being run. Multiple magnetic layer coating liquids can be successively or simultaneously coated in a multilayer coating, or a nonmagnetic layer coating liquid and a magnetic layer coating liquid can be successively or simultaneously coated in a multilayer coating. Coating machines suitable for use in coating the coating liquid for each layer are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center K.K. may be referred to in this regard. The content of the above publication is expressly incorporated herein by reference in its entirety. For the details regarding the coating process, reference can also be made to paragraphs [0067] and [0068] of Japanese Unexamined Patent Publication (KOKAI) No. 2004-295926, which is expressly incorporated herein by reference in its entirety.

The medium after the coating process can be subjected to post-processing such as orientation processing of the magnetic layer, surface smoothing processing (calendering), and the like. For the details regarding the post-processing, reference can also be made to paragraphs [0070] to [0073] of Japanese Unexamined Patent Publication (KOKAI) No. 2004-295926, which is expressly incorporated herein by reference in its entirety. The magnetic recording medium that is obtained can be cut to desired size with a cutter, punching machine the like for use.

EXAMPLES

The present invention will be described in detail below based on Examples. However, the present invention is not limited to the examples. The "parts" given in Examples are weight parts unless specifically stated otherwise. The weight average molecular weights described below are values that were obtained by conversion to standard polystyrene using DMF solvent containing 0.3 weight percent lithium bromide. As for the copolymers containing multiple structural units, the numeric values positioned to the right of the various structural units denote the molar ratios of the various structural units relative to all polymerization units in the copolymers below.

Reference Example 1

Synthesis of a Graft Chain Monomer (Example Compound G-6)

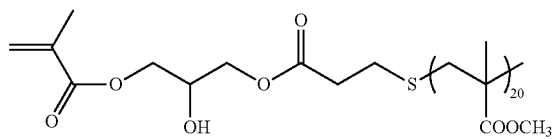

G-6

To a reaction vessel equipped with stirrer and reflux condenser were charged 100 g of methyl methacrylate, 4.61 g of thioglycolic acid, 0.164 g of AIBN, and 10 g of THF, the mixture was heated at 80° C. for one hour in a nitrogen atmosphere, and the reaction was ended. Purification by reprecipitation from 5 L of hexane was conducted and the mixture was dried for 3 hours 50° C. in a vacuum dryer, yielding a white solid. The number average molecular weight was $2.4 \times 10^3$.

To a reaction vessel equipped with stirrer and reflux condenser were charged 10 g of the above white solid, 1.35 g of glycidyl methacrylate, 0.01 g of hydroquinone, 0.01 g of N,N-dimethyllaurylamine, and 20 g of xylene, the mixture was hot refluxed for five hours in a nitrogen atmosphere, and the reaction was ended. Following the reaction, purification by reprecipitation was conducted by the same method as above, yielding G-6. The number average molecular weight was $2.3 \times 10^3$.

The graft chain monomers employed in the synthesis examples below were synthesized by the same method as in Reference Example 1 by varying the type and weight ratio (molar percentages) of the monomers employed.

Synthesis Example 1

Synthesis of Vinyl Copolymer Having Structural Units [G] and [P]

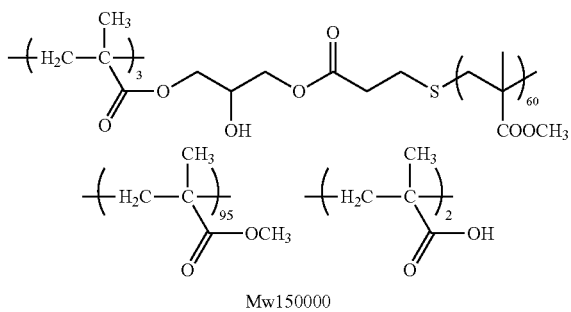

To a reaction vessel equipped with stirrer and reflux condenser were charged 17.1 g of Example Compound G-2, 8.5 g of methyl methacrylate, 0.13 g of methacrylic acid, 0.27 g of dimethyl 2,2'-azobisisobutyrate, and 52.0 g of 2-butanone, the mixture was heated to 78° C. for 9 hours in a nitrogen atmosphere, and the reaction was ended. The weight average molecular weight was the above value. Following the reaction, GPC analysis revealed no residual monomer or residual oligomer peaks. Thus, the fact that a copolymer incorporating the various structural units in the charge ratio had been obtained was confirmed.

Synthesis Examples 2 to 9

Synthesis of Acrylic Copolymers Having Structural Units [G], [P], [1], [2], and [3]

Acrylic copolymers P-4, P-6, P-9, P-11, P-16, P-20, P-23, and P-25 were obtained by the same method as in Synthesis Example 1 by varying the types and weight ratios (molar percentages) of the monomers employed. The weight average molecular weight of each of the copolymers was measured, and the values indicated above were confirmed. Following the reaction, GPC analysis revealed no residual monomer or residual oligomer peaks. Thus, it was confirmed that copolymers incorporating the various structural units in the charge ratio had been obtained.

The content of the polar groups (polar groups selected from the group consisting of sulfonic acid (salt) groups, carboxylic acid (salt) groups, and phosphoric acid (salt) groups) of the copolymers obtained in the synthesis examples were calculated from the charge quantities of the starting material monomers. The results are given below.

Synthesis Example 1 (Example Compound P-2): 60 eq/g
Synthesis Example 2 (Example Compound P-4): 33 eq/g
Synthesis Example 3 (Example Compound P-6): 83 eq/g
Synthesis Example 4 (Example Compound P-9): 33 eq/g
Synthesis Example 5 (Example Compound P-11): 56 eq/g
Synthesis Example 6 (Example Compound P-16): 146 eq/g
Synthesis Example 7 (Example Compound P-20): 39 eq/g
Synthesis Example 8 (Example Compound P-23): 74 eq/g
Synthesis Example 9 (Example Compound P-25): 60 eq/g Comparative Synthesis Example 1

Synthesis of Acrylic Copolymer BP-1 Comprising Just Structural Unit [G]

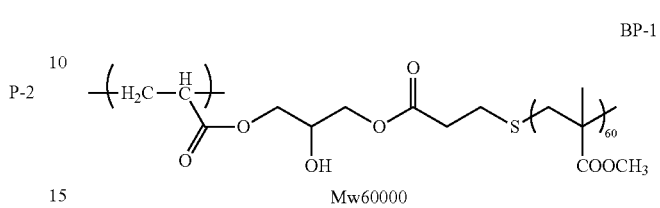

To a reaction vessel equipped with stirrer and reflux condenser were charged 25.6 g of Example Compound G-1, 0.1 g of dimethyl 2,2'-azobisisobutyrate, and 31.0 g of 2-butanone. The mixture was heated to 78° C. for nine hours in a nitrogen atmosphere and the reaction was ended, yielding acrylic copolymer BP-1 having the above structural unit. The weight average molecular weight was $6.0 \times 10^5$.

Comparative Synthesis Example 2

Synthesis of Acrylic Copolymer BP-2 Comprising Just Structural Unit [P]

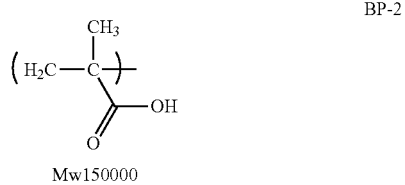

To a reaction vessel equipped with stirrer and reflux condenser were charged 22.0 g of methacrylic acid, 1.0 g of dimethyl 2,2'-azobisisobutyrate, 1.6 g of dimethyl 2,2'-azobisisobutyrate, and 31.0 g of N-methylpyrrolidinone. The mixture was heated to 78° C. for nine hours in a nitrogen atmosphere and the reaction was ended, yielding acrylic copolymer BP-2 having the above structural unit. The weight average molecular weight was $1.5 \times 10^6$.

Comparative Synthesis Example 3

Synthesis of Acrylic Copolymer BP-3 Comprising Structural Units [P], [1], [2], and [3]

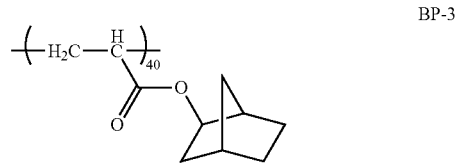

-continued

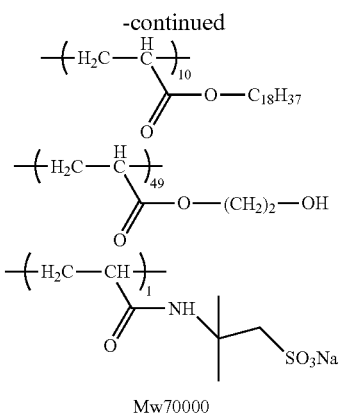

Mw70000

To a reaction vessel equipped with stirrer and reflux condenser were charged 37.1 g of Example Compound A-1, 14.2 g of stearyl methacrylate, 27.9 g of 2,2-hydroxyethyl acrylate, 0.24 g of AMPS, and 74.5 g of N-methylpyrrolidinone. The mixture was heated to 78° C. for nine hours in a nitrogen atmosphere and the reaction was ended, yielding acrylic copolymer BP-3 having the above structural units.

The weight average molecular weight was $7.0 \times 10^5$. Following the reaction, GPC analysis revealed no residual monomer or residual oligomer peaks. Thus, it was confirmed that copolymers incorporating the various structural units in the charge ratio had been obtained.

Example 1-1

(1) Preparation of Magnetic Layer Coating Liquid
Ferromagnetic metal powder: 100 parts
Composition: Fe/Co=100/25
Hc: 2,450 Oe (approx. 195 kA/m)
Specific surface area by BET method: 65 m$^2$/g
Surface treatment agents: Al$_2$O$_3$, SiO$_2$, Y$_2$O$_3$
Particle size (average major axis length): 45 nm
Acicular ratio: 5
σs: 110 emu/g (approx. 110 A·m$^2$/kg)
Phenylphosphonic acid: 3 parts
Acrylic copolymer P-2: 15 parts
Methyl ethyl ketone: 150 parts
Cyclohexanone: 150 parts
α-Al$_2$O$_3$ Mohs' hardness 9 (average particle diameter: 0.1 μm): 15 parts
Carbon black (average particle size: 0.08 μm): 0.5 part
The above components were kneaded in an open kneader and dispersed using a ball mill. The following components were added to the dispersion obtained. The mixture was stirred, ultrasonically processed, and passed through a filter having an average pore diameter of 1 μm to prepare a magnetic layer coating liquid.
Butyl stearate: 1.5 parts
Stearic acid: 0.5 part
Methyl ethyl ketone: 50 parts
Cyclohexanone: 50 parts
Toluene: 3 parts
Polyisocyanate compound (Coronate 3041 made by Nippon Polyurethane Industry Co., Ltd.): 5 parts
(2) Preparation of Nonmagnetic Layer Coating Liquid
Nonmagnetic powder (α-Fe$_2$O$_3$ hematite): 80 parts
Average major axis length: 0.15 μm
Specific surface area by BET method: 52 m$^2$/g
pH: 6
Tap density: 0.8
DBP oil absorption capacity: 27 to 38 g/100 g
Surface treatment agents: Al$_2$O$_3$, SiO$_2$
Carbon black: 20 parts
Average primary particle diameter: 0.020 μm
DBP oil absorption capacity: 80 mL/100 g
pH: 8.0
Specific surface area by BET method: 250 m$^2$/g
Volatile content: 1.5 percent
Acrylic copolymer P-2: 19 parts
Methyl ethyl ketone: 150 parts
Cyclohexanone: 150 parts
The above components were kneaded in an open kneader and dispersed using a ball mill. The following components were added to the dispersion obtained. The mixture was stirred, ultrasonically processed, and passed through a filter having an average pore diameter of 1 μm to prepare a lower coating layer (nonmagnetic layer) coating liquid.
Butyl stearate: 1.5 parts
Stearic acid: 1 part
Methyl ethyl ketone: 50 parts
Cyclohexanone: 50 parts
Toluene: 3 parts
Polyisocyanate compound (Coronate 3041 made by Nippon Polyurethane Industry Co., Ltd.): 5 parts
(3) Preparation of Backcoat Layer Coating Liquid
Carbon black (average particle diameter 40 nm): 85 parts
Carbon black (average particle diameter 100 nm): 3 parts
Nitrocellulose: 28 parts
Polyurethane resin: 58 parts
Copper phthalocyanine dispersing agent: 2.5 parts
Nipporan 2301 (made by Nippon Polyurethane Industry Co., Ltd.): 0.5 part
Methyl isobutyl ketone: 0.3 part
Methyl ethyl ketone: 860 parts
Toluene: 240 parts
The above components were prekneaded in a roll mill and dispersed in a sand mill. Four parts of polyester resin (Vylon 500 made by Toyobo Co., Ltd.), 14 parts of polyisocyanate compound (Coronate 3041 made by Nippon Polyurethane Industry Co., Ltd.), and 5 parts of α-Al$_2$O$_3$ (made by Sumitomo Chemicals) were added and the mixture was stirred and filtered to prepare a backcoat layer coating liquid.
(4) Preparation of Magnetic Tape
Simultaneous multilayer coating was conducted by applying the above nonmagnetic layer coating liquid in a quantity calculated to yield a dry thickness of 1.0 μm on a polyethylene naphthalate resin support that had been corona processed in advance to render the base surface hydrophilic, was 5 μm in thickness, and had a centerline surface roughness of the magnetic layer coating surface of 0.001 μm, and immediately thereafter, applying a magnetic layer to a thickness of 0.1 μm thereover. While the two layers were still wet, orientation was conducted with a cobalt magnetic having a magnetic force of 0.5 T (5,000 G) and a solenoid having a magnetic force of 0.4 T (4,000 G), and then dried. Subsequently, the above backcoat layer coating liquid was applied in a quantity calculated to yield a dry thickness of 0.5 μm on the opposite surface from the above-described base surface, which had also been corona processed in advance. The product was then processed at a rate of 80 m/min at a temperature of 100° C. with a seven-stage calender comprised of metal rolls and slit to a width of ½ mm to prepare a magnetic tape.

Examples 1-2 to 1-9

With the exception that the types of acrylic copolymer employed in the magnetic layer and nonmagnetic layer were changed as indicated in Table 1, the magnetic tapes of Examples 1-2 to 1-9 were prepared in the same manner as in Example 1-1.

Comparative Example 1-1

With the exception that the types of acrylic copolymer employed in the magnetic layer and nonmagnetic layer were changed to those described in Example 2 of Japanese Unexamined Patent Publication (KOKAI) Heisei No. 8-67855, the magnetic tape of Comparative Example 1-1 was prepared in the same manner as in Example 1-1.

Comparative Example 1-2

With the exception that the types of acrylic copolymer employed in the magnetic layer and nonmagnetic layer were changed to those described in Example 3 of Japanese Unexamined Patent Publication (KOKAI) No. 2004-295926, the magnetic tape of Comparative Example 1-2 was prepared in the same manner as in Example 1-1.

Comparative Example 1-3

With the exception that the types of acrylic copolymer employed in the magnetic layer and nonmagnetic layer were changed to those described in Example 4 of Japanese Unexamined Patent Publication (KOKAI) Heisei No. 6-111277, the magnetic tape of Comparative Example 1-3 was prepared in the same manner as in Example 1-1.

Comparative Example 1-4

With the exception that the types of acrylic copolymer employed in the magnetic layer and nonmagnetic layer were changed to those described in Reference Example 1 of Japanese Examined Patent Publication (KOKAI) Heisei No. 7-9696, the magnetic tape of Comparative Example 1-4 was prepared in the same manner as in Example 1-1.

Comparative Example 1-5

With the exception that the types of acrylic copolymer employed in the magnetic layer and nonmagnetic layer were changed to those described in Reference Example 7 of Japanese Examined Patent Publication (KOKAI) Heisei No. 7-9696, the magnetic tape of Comparative Example 1-5 was prepared in the same manner as in Example 1-1.

Comparative Examples 1-6 to 1-8

With the exception that the types of acrylic copolymer employed in the magnetic layer and nonmagnetic layer were changed to those indicated in Table 1, the magnetic tapes of Comparative Examples 1-6 to 1-8 were prepared in the same manner as in Example 1-1.

Example 2-1

(1) Preparation of Ferromagnetic Hexagonal Ferrite Magnetic Layer Coating Liquid
Ferromagnetic plate-like hexagonal ferrite powder: 100 parts
  Composition excluding oxygen (molar ratio): Ba/Fe/Co/Zn=1/9/0.2/1
  Hc: 160 kA/m (2,000 Oe)
  Average plate diameter: 20 nm
  Average plate ratio: 2.7
  BET specific surface area: 60 m$^2$/g
  σs: 46 A·m$^2$/kg (46 emu/g)
Acrylic copolymer P-2: 12 parts
α-Al$_2$O$_3$ (particle size: 0.1 μm): 8 parts
Carbon black (average particle diameter: 20 nm): 0.5 part
Cyclohexanone: 110 parts The above components were kneaded in an open kneader and dispersed in a sand mill. The following components were added to the dispersion obtained. The mixture was stirred, ultrasonically processed, and passed through a filter having an average pore diameter of 1 μm to prepare a magnetic layer coating liquid.
Butyl stearate: 2.0 parts
Stearic acid: 0.5 part
Methyl ethyl ketone: 50 parts
Cyclohexanone: 50 parts
Toluene: 3 parts
Polyisocyanate compound (Coronate 3041 made by Nippon Polyurethane Industry Co., Ltd.): 5 parts Simultaneous multilayer coating was conducted by applying a nonmagnetic layer coating liquid prepared by the same method as in Example 1-1 in a quantity calculated to yield a dry thickness of 1.0 μm on a polyethylene naphthalate resin support that had been corona processed in advance to render the base surface hydrophilic, was 5 μm in thickness, and had a centerline surface roughness of the magnetic layer coating surface of 0.001 μm, and immediately thereafter, applying thereover the above magnetic layer coating liquid in a quantity calculated to yield a magnetic layer 0.1 μm in thickness. While the two layers were still wet, orientation was conducted with a cobalt magnet having a magnetic force of 0.5 T (5,000 G) and a solenoid having a magnetic force of 0.4 T (4,000 G). Subsequently, a backcoat layer coating liquid that had been prepared by the same method as in Example 1-1 was applied in a quantity calculated to yield a dry thickness of 0.5 μm on the opposite surface from the above-described base surface, which had also been corona processed in advance. The product was then processed at a rate of 80 m/min at a temperature of 100° C. with a seven-stage calender comprised of metal rolls and slit to a width of ½ mm to prepare the magnetic tape of Example 2-1.

Examples 2-2 to 2-9

With the exception that the types of acrylic copolymer employed in the magnetic layer and nonmagnetic layer were changed to those indicated in Table 2, the magnetic tapes of Examples 2-2 to 2-9 were prepared in the same manner as in Example 2-1.

Comparative Example 2-1

With the exception that the types of acrylic copolymer employed in the magnetic layer and nonmagnetic layer were changed to those described in Example 2 of Japanese Unexamined Patent Publication (KOKAI) Heisei No. 8-67855, the magnetic tape of Comparative Example 2-1 was prepared in the same manner as in Example 2-1.

Comparative Example 2-2

With the exception that the types of acrylic copolymer employed in the magnetic layer and nonmagnetic layer were changed to those described in Example 3 of Japanese Unexamined Patent Publication (KOKAI) No. 2004-295926, the magnetic tape of Comparative Example 2-2 was prepared in the same manner as in Example 2-1.

Comparative Example 2-3

With the exception that the types of acrylic copolymer employed in the magnetic layer and nonmagnetic layer were changed to those described in Example 4 of Japanese Unexamined Patent Publication (KOKAI) Heisei No. 6-111277, the magnetic tape of Comparative Example 2-3 was prepared in the same manner as in Example 2-1.

Comparative Example 2-4

With the exception that the types of acrylic copolymer employed in the magnetic layer and nonmagnetic layer were changed to those described in Reference Example 1 of Japanese Examined Patent Publication (KOKAI) Heisei No. 7-9696, the magnetic tape of Comparative Example 2-4 was prepared in the same manner as in Example 2-1.

Comparative Example 2-5

With the exception that the types of acrylic copolymer employed in the magnetic layer and nonmagnetic layer were changed to those described in Reference Example 7 of Japanese Examined Patent Publication (KOKAI) Heisei No. 7-9696, the magnetic tape of Comparative Example 2-5 was prepared in the same manner as in Example 2-1.

Comparative Examples 2-6 to 2-8

With the exception that the types of acrylic copolymer employed in the magnetic layers and nonmagnetic layers were changed to those indicated in Table 2, the magnetic tapes of Comparative Examples 2-6 to 2-8 were prepared in the same manner as in Example 2-1.

Measurement Methods

Average Surface Roughness of Tape

A 40×40 micrometer area of the magnetic layer surface was measured in contact mode with an atomic force microscope (AFM: Nanoscope III made by Digital Instruments) and the centerline average surface roughness (Ra) was measured.

Electromagnetic Characteristics: S/N Ratio

Signals were recorded at linear recording densities of 172 kfci and 86 kfci on recording tracks of 11.5 µm with a reproduction track width of 5.3 µm using an LTO-Gen4 drive. The reproduced signal was frequency analyzed with a spectrum analyzer. The ratio of the output of the carrier signal during 172 kfci signal recording to the noise integrated over the entire spectral band during 86 kfci signal recording was adopted as the S/N ratio. A FUJIFILM LTO-Gen4 tape was employed as a reference tape. The S/N ratio of the reference tape was adopted as 0 dB and the S/N values of the various tapes were calculated as relative values. An S/N ratio of equal to or greater than 0 dB indicated good electromagnetic characteristics as a magnetic recording medium for high-density recording.

Amount of Grime on Tape Surface

The tape was run at an angle of 150° so that the magnetic layer surface contacted the edge of a square bar having a cross section of 7×7 mm that was made of $Al_2O_3$/TiC. Under conditions of a load of 100 g and a rate of 6 m/s, a 100 m length was slid during each pass. The edge of the square bar was then observed under a microscope and the state of adhesion of grime was evaluated. Sensory evaluation was conducted on a scale of 1 to 10. A rating of 10 indicated little grime, and a rating of 1 indicated maximum grime.

The grime evaluated by the above method was primarily produced by shaving of the magnetic layer surface. The lower the value of the evaluation result, the greater the shaving of the magnetic layer surface and the poorer the running durability.

TABLE 1

Examples and Comparative Examples using ferromagnetic metal powder

| | Acrylic copolymer | Dispersibility | | Running durability |
|---|---|---|---|---|
| | | Surface property Ra(nm) | S/N(dB) | Amount of grime (Poor)1-10(Good) |
| Ex. 1-1 | P-2 | 2.2 | 1.0 | 5 |
| Ex. 1-2 | P-4 | 2.3 | 1.0 | 5 |
| Ex. 1-3 | P-6 | 2.4 | 1.5 | 5 |
| Ex. 1-4 | P-9 | 2.3 | 1.0 | 7 |
| Ex. 1-5 | P-11 | 2.0 | 2.5 | 9 |
| Ex. 1-6 | P-16 | 1.9 | 2.5 | 8 |
| Ex. 1-7 | P-20 | 2.0 | 2.0 | 8 |
| Ex. 1-8 | P-23 | 1.9 | 2.0 | 8 |
| Ex. 1-9 | P-25 | 1.8 | 3.0 | 10 |
| Comp. Ex. 1-1 | Example 2 in Japanese Unexamined Patent Publication (KOKAI) Heisei No. 8-67855 | 5.0 | −5.0 | 3 |
| Comp. Ex. 1-2 | Example 3 of Japanese Unexamined Patent Publication (KOKAI) No. 2004-295926 | 4.7 | −3.0 | 4 |
| Comp. Ex. 1-3 | Example 4 in Japanese Unexamined Patent Publication (KOKAI) Heisei No. 6-111277 | 4.5 | −3.5 | 7 |
| Comp. Ex. 1-4 | Reference Example 1 in Japanese Examined | 3.0 | −1.0 | 1 |

TABLE 1-continued

Examples and Comparative Examples using ferromagnetic metal powder

|  | Acrylic copolymer | Dispersibility Surface property Ra(nm) | S/N(dB) | Running durability Amount of grime (Poor)1-10(Good) |
|---|---|---|---|---|
| Comp. Ex. 1-5 | Patent Publication (KOKAI) Heisei No. 7-9696 Reference Example 7 in Japanese Examined Patent Publication (KOKAI) Heisei No. 7-9696 | 3.5 | −1.5 | 2 |
| Comp. Ex. 1-6 | BP-1 | 4.0 | −2.0 | 3 |
| Comp. Ex. 1-7 | BP-2 | 6.9 | −5.0 | 1 |
| Comp. Ex. 1-8 | BP-3 | 2.8 | 0.0 | 7 |

TABLE 2

Examples and Comparative Examples using hexagonal ferrite powder

|  | Acrylic copolymer | Dispersibility Surface property Ra(nm) | S/N(dB) | Running durability Amount of grime (Poor)1-10(Good) |
|---|---|---|---|---|
| Ex. 2-1 | P-2 | 2.0 | 1.0 | 5 |
| Ex. 2-2 | P-4 | 2.1 | 1.0 | 5 |
| Ex. 2-3 | P-6 | 2.0 | 1.5 | 6 |
| Ex. 2-4 | P-9 | 2.1 | 2.0 | 7 |
| Ex. 2-5 | P-11 | 1.8 | 3.5 | 10 |
| Ex. 2-6 | P-16 | 1.7 | 3.0 | 10 |
| Ex. 2-7 | P-20 | 1.8 | 3.5 | 10 |
| Ex. 2-8 | P-23 | 1.9 | 3.0 | 10 |
| Ex. 2-9 | P-25 | 1.7 | 3.0 | 10 |
| Comp. Ex. 2-1 | Example 2 in Japanese Unexamined Patent Publication (KOKAI) Heisei No. 8-67855 | 3.1 | −2.0 | 10 |
| Comp. Ex. 2-2 | Example 3 of Japanese Unexamined Patent Publication (KOKAI) No. 2004-295926 | 4.0 | −2.0 | 4 |
| Comp. Ex. 2-3 | Example 4 in Japanese Unexamined Patent Publication (KOKAI) Heisei No. 6-111277 | 3.5 | −1.5 | 7 |
| Comp. Ex. 2-4 | Reference Example 1 in Japanese Examined Patent Publication (KOKAI) Heisei No. 7-9696 | 3.0 | 0.0 | 2 |
| Comp. Ex. 2-5 | Reference Example 7 in Japanese Examined Patent Publication (KOKAI) Heisei No. 7-9696 | 3.1 | −1.0 | 1 |
| Comp. Ex. 2-6 | BP-1 | 3.1 | −1.0 | 3 |
| Comp. Ex. 2-7 | BP-2 | 5.5 | −1.5 | 1 |
| Comp. Ex. 2-8 | BP-3 | 2.9 | 0.0 | 8 |

Evaluation Results

The magnetic tapes of the Examples formed using the binder of the present invention had highly smooth surfaces. Thus, the fact that the microparticulate powder was dispersed to a high degree by the binder of the present invention was confirmed. As a result, the magnetic tapes of the Examples exhibited good electromagnetic characteristics.

(2) By contrast, the magnetic tapes of Comparative Examples 1-1 to 1-5 and 2-1 to 2-5, in which the vinyl copolymers conventional employed as binders in magnetic recording media were employed, exhibited poorer results than the magnetic tapes of the Examples in the evaluation items of surface smoothness and electromagnetic characteristics.

(3) The magnetic tapes of Comparative Examples 1-6 and 2-6, in which copolymers having only structural unit [G] was employed, and the magnetic tapes of Comparative Examples 1-7 and 2-7, in which copolymers having only structural unit [P] was employed, exhibited poorer results than the magnetic tapes of the Examples in the evaluation items of surface smoothness and electromagnetic characteristics. Further, the magnetic tapes of Comparative Examples 1-8 and 2-8, in which copolymers containing structural units [P], [1], [2], and [3] but not structural unit [G] were employed, exhibited poorer results than the Examples despite relatively enhanced surface smoothness and electromagnetic characteristics. Thus, the combination of structural units [G] and [P] was determined to make it possible to achieve both electromagnetic characteristics and running durability.

(4) Further improvement in surface smoothness and good running durability was confirmed in magnetic tapes containing binder in the form of copolymers having structural units [1], [2], and [3] in addition to structural units [G] and [P].

(5) With conventional vinyl polymers alone, it is difficult to form high-strength coatings. When employed in combination with a polyurethane resin, coating strength is ensured (see, for example, Documents 2 and 3). By contrast, good running durability was achieved by means of a vinyl copolymer (the binder of the present invention) in the magnetic tapes of the Examples without combining a polyurethane resin.

The above results indicate that the binder of the present invention is a vinyl copolymer capable of manufacturing magnetic recording media with both good running durability and good electromagnetic characteristics.

The magnetic recording medium of the present invention can afford both good electromagnetic characteristics and running durability, and is thus suitable as a backup tape or the like, of which high reliability is demanded.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A binder composition for a magnetic recording medium, which comprises a vinyl copolymer comprising a structural unit denoted by general formula [G] and a structural unit denoted by general formula [P]:

General formula [G]

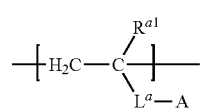

wherein, in general formula [G], $R^{a1}$ denotes a hydrogen atom, a halogen atom, or a methyl group, $L^a$ denotes a single bond or a divalent linking group, and A denotes a repeating unit denoted by general formula [a]:

General formula [a]

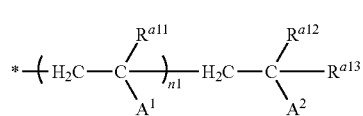

wherein, in general formula [a], each of $R^{a11}$, $R^{a12}$, and $R^{a13}$ independently denotes a hydrogen atom, a halogen atom, or a methyl group, each of $A^1$ and $A^2$ independently denotes a vinyl monomer residue, n1 denotes an integer of equal to or greater than 1, and * denotes a position of a bond with the group denoted by $L^a$;

General formula [P]

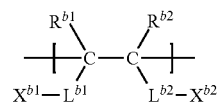

wherein, in general formula [P], each of $R^{b1}$ and $R^{b2}$ independently denotes a hydrogen atom, a halogen atom, or a methyl group, each of $L^{b1}$ and $L^{b2}$ independently denotes a single bond or a divalent linear linking group, each of $X^{b1}$ and $X^{b2}$ denotes a hydrogen atom, a halogen atom, a methyl group, or a polar group selected from the group consisting of a sulfonic acid group, a sulfonate group, a carboxylic acid group, a carboxylate group, a phosphoric acid group, a phosphate group, and a salt thereof, wherein at least either $X^{b1}$ or $X^{b2}$ is the polar group.

2. The binder composition for a magnetic recording medium according to claim 1, wherein the repeating unit denoted by general formula [a] is a repeating unit denoted by general formula [a1]:

General formula [a1]

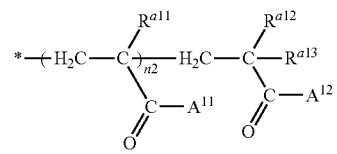

wherein, in general formula [a1], each of $R^{a11}$, $R^{a12}$, $R^{a13}$, and * is defined as in general formula [a], each of $A^{11}$ and $A^{12}$ independently denotes a (meth)acrylate monomer residue, and n2 denotes an integer of equal to or greater than 10 but equal to or less than 500.

3. The binder composition for a magnetic recording medium according to claim 1, wherein the vinyl copolymer further comprises a structural unit denoted by general formula [1], a structural unit denoted by general formula [2], and a structural unit denoted by general formula [3]:

General formula [1]

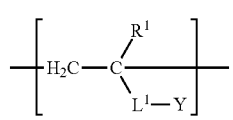

wherein, in general formula [1], $R^1$ denotes a hydrogen atom, a halogen atom, or a methyl group, $L^1$ denotes a single bond or a divalent linking group, and Y an alicyclic group;

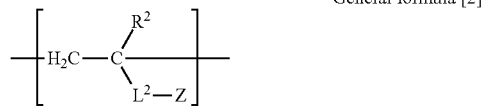

General formula [2]

wherein, in general formula [2], $R^2$ denotes a hydrogen atom, a halogen atom, or a methyl group, $L^2$ denotes a single bond or a divalent linking group, and Z denotes a hydrocarbon group with a carbon number ranging from 8 to 50;

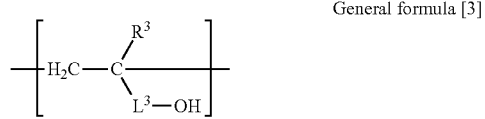

General formula [3]

wherein, in general formula [3], $R^3$ denotes a hydrogen atom, a halogen atom, or a methyl group, and $L^3$ denotes a single bond or a divalent linking group.

4. The binder composition for a magnetic recording medium according to claim 3, wherein the structural unit denoted by general formula [3] is a structural unit denoted by general formula [6]:

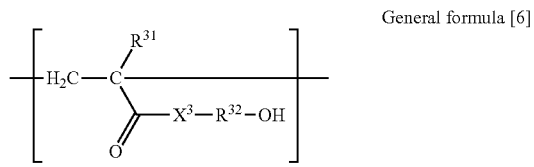

General formula [6]

wherein, in general formula [6], $R^{31}$ denotes a hydrogen atom or a methyl group, $X^3$ denotes —O—, —S—, or a divalent linking group denoted by —N($R^{33}$)—, $R^{33}$ denotes a hydrogen atom or an optionally substituted alkyl group with a carbon number ranging from 1 to 8, and $R^{32}$ denotes an optionally substituted alkylene group with a carbon number ranging from 2 to 8 or a divalent group in which multiple such alkylene groups are linked through a linking group.

5. The binder composition for a magnetic recording medium according to claim 3, wherein the structural unit denoted by general formula [1] is a structural unit denoted by general formula [4]:

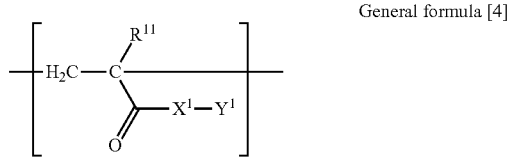

General formula [4]

wherein, in general formula [4], $R^{11}$ denotes a hydrogen atom or a methyl group, $X^1$ denotes —O—, —S—, or a divalent linking group denoted by —N($R^{12}$)—, denotes a hydrogen atom or an optionally substituted alkyl group with a carbon number ranging from 1 to 8, and $Y^1$ denotes an alicyclic condensed cyclic group.

6. The binder composition for a magnetic recording medium according to claim 3, wherein the structural unit denoted by general formula [2] is a structural unit denoted by general formula [5]:

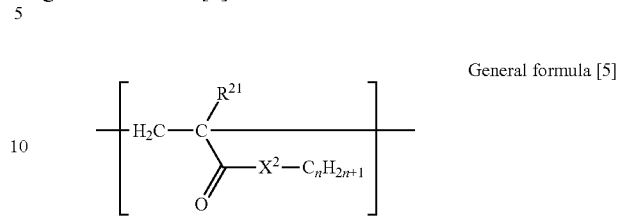

General formula [5]

wherein, in general formula [5], $R^{21}$ denotes a hydrogen atom or a methyl group, $X^2$ denotes a divalent linking group denoted by —(O)$m^1$-, —(S)$m^2$-, or —{N($R^{22}$)}$m^3$-, each of $m^1$, $m^2$, and $m^3$ independently denotes an integer of equal to or greater than 1, $R^{22}$ denotes an optionally substituted alkyl group with a carbon number ranging from 1 to 8, and n denotes an integer ranging from 12 to 30.

7. The binder composition for a magnetic recording medium according to claim 1, which further comprises a polyisocyanate.

8. A magnetic recording medium comprising a magnetic layer comprising a ferromagnetic powder and a binder on a nonmagnetic support, which comprises at least one layer comprising a binder of which constituent component is a vinyl copolymer comprising a structural unit denoted by general formula [G] and a structural unit denoted by general formula [P]:

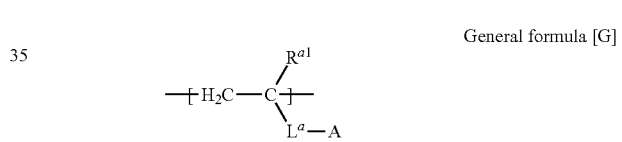

General formula [G]

wherein, in general formula [G], $R^{a1}$ denotes a hydrogen atom, a halogen atom, or a methyl group, $L^a$ denotes a single bond or a divalent linking group, and A denotes a repeating unit denoted by general formula [a]:

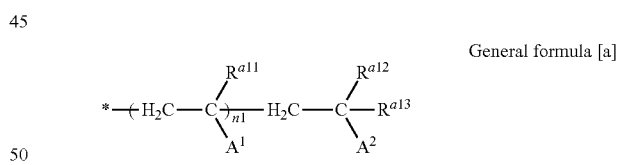

General formula [a]

wherein, in general formula [a], each of $R^{a11}$, $R^{a12}$, and $R^{a13}$ independently denotes a hydrogen atom, a halogen atom, or a methyl group, each of $A^1$ and $A^2$ independently denotes a vinyl monomer residue, n1 denotes an integer of equal to or greater than 1, and * denotes a position of a bond with the group denoted by $L^a$;

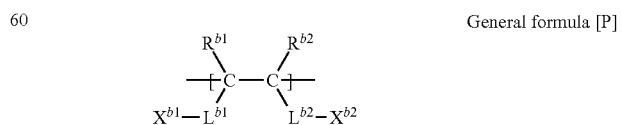

General formula [P]

wherein, in general formula [P], each of $R^{b1}$ and $R^{b2}$ independently denotes a hydrogen atom, a halogen atom, or a methyl group, each of $L^{b1}$ and $L^{b2}$ independently denotes a single bond or a divalent linear linking group, each of $X^{b1}$ and $X^{b2}$ denotes a hydrogen atom, a halogen atom, a methyl group, or a polar group selected from the group consisting of a sulfonic acid group, a sulfonate group, a carboxylic acid group, a carboxylate group, a phosphoric acid group, a phosphate group, and a salt thereof, wherein at least either $X^{b1}$ or $X^{b2}$ is the polar group.

9. The magnetic recording medium according to claim 8, wherein the repeating unit denoted by general formula [a] is a repeating unit denoted by general formula [a1]:

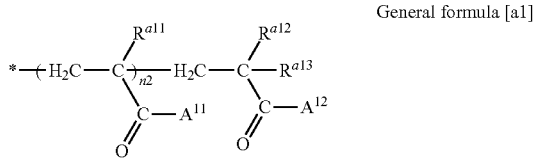

General formula [a1]

wherein, in general formula [a1], each of $R^{a11}$, $R^{a12}$, $R^{a13}$, and is defined as in general formula [a], each of $A^{11}$ and $A^{12}$ independently denotes a (meth)acrylate monomer residue, and n2 denotes an integer of equal to or greater than 10 but equal to or less than 500.

10. The magnetic recording medium according to claim 8, wherein the vinyl copolymer further comprises a structural unit denoted by general formula [1], a structural unit denoted by general formula [2], and a structural unit denoted by general formula [3]:

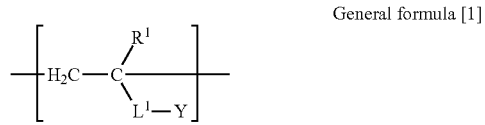

General formula [1]

wherein, in general formula [1], $R^1$ denotes a hydrogen atom, a halogen atom, or a methyl group, $L^1$ denotes a single bond or a divalent linking group, and Y an alicyclic group;

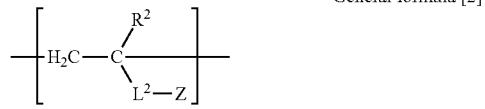

General formula [2]

wherein, in general formula [2], $R^2$ denotes a hydrogen atom, a halogen atom, or a methyl group, $L^2$ denotes a single bond or a divalent linking group, and Z denotes a hydrocarbon group with a carbon number ranging from 8 to 50;

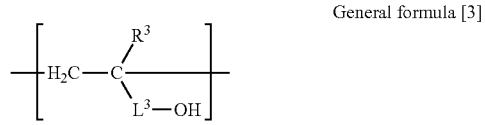

General formula [3]

wherein, in general formula [3], $R^3$ denotes a hydrogen atom, a halogen atom, or a methyl group, and $L^3$ denotes a single bond or a divalent linking group.

11. The magnetic recording medium according to claim 10, wherein the structural unit denoted by general formula [3] is a structural unit denoted by general formula [6]:

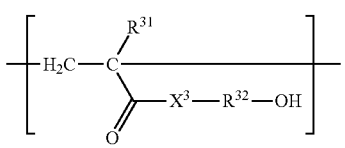

General formula [6]

wherein, in general formula [6], $R^{31}$ denotes a hydrogen atom or a methyl group, $X^3$ denotes —O—, —S—, or a divalent linking group denoted by —N($R^{33}$)—, $R^{33}$ denotes a hydrogen atom or an optionally substituted alkyl group with a carbon number ranging from 1 to 8, and $R^{32}$ denotes an optionally substituted alkylene group with a carbon number ranging from 2 to 8 or a divalent group in which multiple such alkylene groups are linked through a linking group.

12. The magnetic recording medium according to claim 10, wherein the structural unit denoted by general formula [1] is a structural unit denoted by general formula [4]:

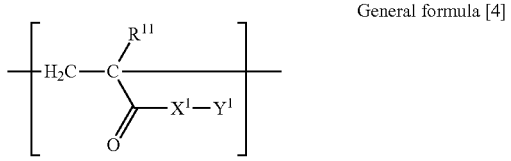

General formula [4]

wherein, in general formula [4], $R^{11}$ denotes a hydrogen atom or a methyl group, $X^1$ denotes —O—, —S—, or a divalent linking group denoted by —N($R^{12}$)—, $R^{12}$ denotes a hydrogen atom or an optionally substituted alkyl group with a carbon number ranging from 1 to 8, and $Y^1$ denotes an alicyclic condensed cyclic group.

13. The magnetic recording medium according to claim 10, wherein the structural unit denoted by general formula [2] is a structural unit denoted by general formula [5]:

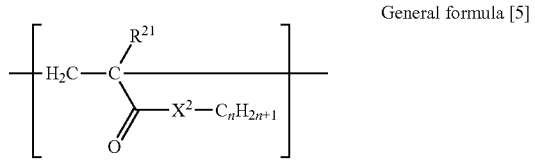

General formula [5]

wherein, in general formula [5], $R^{21}$ denotes a hydrogen atom or a methyl group, $X^2$ denotes a divalent linking group denoted by —(O)$m^1$-, —(S)$m^2$-, or —{N($R^{22}$)}$m^3$-, each of $m^1$, $m^2$, and $m^3$ independently denotes an integer of equal to or greater than 1, $R^{22}$ denotes an optionally substituted alkyl group with a carbon number ranging from 1 to 8, and n denotes an integer ranging from 12 to 30.

14. The magnetic recording medium according to claim 8, wherein the layer comprises a reaction product of the vinyl copolymer and a polyisocyanate.

15. The magnetic recording medium according to claim 8, wherein the layer is the magnetic layer.

16. The magnetic recording medium according to claim 8, wherein the layer is a nonmagnetic layer comprising a nonmagnetic powder and a binder and being positioned between the magnetic layer and the nonmagnetic support.

17. The magnetic recording medium according to claim 8, wherein the ferromagnetic powder is a hexagonal ferrite powder having an average plate diameter ranging from 10 nm to 50 nm.

18. The magnetic recording medium according to claim 8, wherein the ferromagnetic powder is a ferromagnetic metal powder having an average major axis length ranging from 20 nm to 50 nm.

* * * * *